US012720577B2

(12) United States Patent
Zhang et al.

(10) Patent No.: US 12,720,577 B2
(45) Date of Patent: Aug. 25, 2026

(54) COMMUNICATION METHOD AND APPARATUS FOR MULTI-NODE SYNCHRONOUS TRANSMISSION

(71) Applicant: HUAWEI TECHNOLOGIES CO., LTD., Shenzhen (CN)

(72) Inventors: Haisen Zhang, Beijing (CN); Hongyu Xiang, Beijing (CN); Bin Xu, Beijing (CN); Bingzhao Li, Beijing (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 18/521,854

(22) Filed: Nov. 28, 2023

(65) Prior Publication Data

US 2024/0098762 A1 Mar. 21, 2024

Related U.S. Application Data

(63) Continuation of application No. PCT/CN2022/092747, filed on May 13, 2022.

(30) Foreign Application Priority Data

May 31, 2021 (CN) ........................ 202110604256.3

(51) Int. Cl.
*H04W 72/30* (2023.01)

(52) U.S. Cl.
CPC .................................. *H04W 72/30* (2023.01)

(58) Field of Classification Search
CPC ....... H04W 72/30; H04W 4/06; H04W 28/10; H04L 47/28; H04L 47/34

(Continued)

(56) References Cited

U.S. PATENT DOCUMENTS

2021/0037347 A1* 2/2021 Kim ...................... H04W 76/27
2022/0337367 A1* 10/2022 Zhu ....................... H04L 12/189

(Continued)

FOREIGN PATENT DOCUMENTS

EP 2012446 A1 1/2009
WO WO-2017034274 A1 * 3/2017 ........... H04W 24/10
WO 2021093154 A1 5/2021

OTHER PUBLICATIONS

Motorola "MAC, RLC and PDCP for EMBMS," 3GPP TSG-RAN WG2 #60bis, R2-080424, Sevilla, Spain, total 2 pages, 3rd Generation Partnership Project, Valbonne, France (Jan. 14-18, 2008).

*Primary Examiner* — Asad M Nawaz
*Assistant Examiner* — Michael Wayne Maddox
(74) *Attorney, Agent, or Firm* — Leydig, Voit & Mayer, Ltd.

(57) ABSTRACT

A communication method and apparatus are provided. The method includes: A first node determines a sending time point of a second PDCP PDU based on first sending status information from a second node, where the first sending status information is associated with a first PDCP PDU, so that the first node can adjust the sending time point of the second PDCP PDU based on a sending situation of the first PDCP PDU, to avoid too many packet losses caused when a MAC PDU of the second PDCP PDU is not completely sent in a timely manner due to splitting and concatenation, so as to improve reliability of a synchronous data transmission mechanism in an NR system, and improve resource utilization.

18 Claims, 9 Drawing Sheets

(58) Field of Classification Search
USPC .......................................................... 370/312
See application file for complete search history.

(56) References Cited

U.S. PATENT DOCUMENTS

| | | | | |
|---|---|---|---|---|
| 2023/0262734 | A1* | 8/2023 | Qi | H04L 12/189<br>455/414.1 |
| 2023/0308221 | A1* | 9/2023 | Kadiri | H04W 28/02 |
| 2024/0129785 | A1* | 4/2024 | Chai | H04W 76/15 |

* cited by examiner

COMMUNICATION METHOD AND APPARATUS FOR MULTI-NODE SYNCHRONOUS TRANSMISSION

CROSS-REFERENCE TO RELATED APPLICATIONS

This application is a continuation of International Application No. PCT/CN2022/092747, filed on May 13, 2022, which claims priority to Chinese Patent Application No. 202110604256.3, filed on May 31, 2021. The disclosures of the aforementioned applications are hereby incorporated by reference in their entireties.

TECHNICAL FIELD

This application relates to the field of communication technologies, and in particular, to a communication method and apparatus.

BACKGROUND

A multimedia broadcast multicast service (MBMS in LTE) in long term evolution (LTE) or a multicast/multicast broadcast service (multicast broadcast service, MBS in NR) in new radio (NR) is mainly applicable to a service oriented to a plurality of user equipments (UE), for example, live streaming or scheduled program playing.

The MBS service may be sent by a network device to the UEs in a unicast form by establishing dedicated bearers for the UEs, or may be sent to the UEs in a multicast form by establishing a dedicated bearer for the MBS service. When a large quantity of UEs need to receive an MBS service, if the service is sent in a unicast form, dedicated bearers need to be established for the large quantity of UEs, and resources are consumed; or if the service is sent to the UEs in a multicast form, a dedicated bearer needs to be established for the MBS, and all UEs interested in the service may receive the MBS through the bearer. This saves air interface resources, improves spectrum utilization, and improves transmission efficiency.

To support multicast data sending, a current LTE system supports a multicast-broadcast single-frequency network (MBSFN) method. Different base stations work at a same frequency. When sending MBMS data, the different base stations send same MBMS data on a same time-frequency resource. In this way, the different base stations send data as if one base station sends the data.

To implement an MBSFN technology, base stations need to negotiate about time-frequency resource information, to ensure that a same time-frequency resource is used when different base stations send an MBMS service. For example, a master control node indicates a sending time point of a PDCP PDU to a slave node, and the slave node sends the PDCP PDU at the time point. However, before sending the PDCP PDU, the slave node may perform an operation such as splitting (or referred to as segmentation) or concatenation on the PDCP PDU, to generate a MAC PDU, and then send the MAC PDU through an air interface. Consequently, an actual sending time point of the PDCP PDU is inconsistent with the sending time point indicated by the master control node, a packet loss may occur, and transmission reliability is affected.

SUMMARY

A communication method and apparatus are provided, to improve reliability of multi-node synchronous transmission.

According to a first aspect, a communication method is provided. The method may be implemented by a first node, and the first node may be a master control node for synchronous transmission. The method includes: The first node sends first target sending time information to a second node. The first target sending time information indicates a sending time point of a first packet data convergence protocol PDCP protocol data unit PDU, and the sending time point of the first PDCP PDU indicates a time point at which the second node is to send the first PDCP PDU to UE. The first node receives first sending status information from the second node. The first sending status information is associated with the first PDCP PDU. The first node sends second target sending time information to the second node based on the first sending status information. The second target sending time information indicates a sending time point of a second PDCP PDU, and the sending time point of the second PDCP PDU indicates a time point at which the second node is to send the second PDCP PDU to the UE.

According to the method, the first node may determine the sending time point of the second PDCP PDU based on the first sending status information from the second node, where the first sending status information is associated with the first PDCP PDU, so that the first node can adjust the sending time point of the second PDCP PDU based on a sending situation of the first PDCP PDU, to avoid too many packet losses caused when a MAC PDU of the second PDCP PDU is not completely sent in a timely manner due to splitting and concatenation, so as to improve reliability of a synchronous data transmission mechanism in NR, and improve resource utilization.

In a possible design, the first node may further send first indication information and/or second indication information. The first indication information may indicate that the first PDCP PDU needs to be synchronously sent by a plurality of nodes. The second indication information may indicate that the second PDCP PDU needs to be synchronously sent by a plurality of nodes. In this design, if the first PDCP PDU or the second PDCP PDU does not need to be synchronously sent by a plurality of nodes, the communication method does not need to be performed. Therefore, the method provided in this application can be implemented more flexibly.

In a possible design, the first node may further send at least one of the following information: an identifier of the second node; information used to request the first sending status information; sending condition information of the first sending status information; third indication information, where the third indication indicates whether the first PDCP PDU includes a plurality of PDCP PDUs belonging to a same synchronization sequence; or fourth indication information, where the fourth indication indicates whether the second PDCP PDU includes a plurality of PDCP PDUs belonging to a same synchronization sequence. According to this method, a synchronous transmission mechanism can be set more flexibly, and an amount of first sending status information can be reduced, to reduce signaling overheads.

In a possible design, the first PDCP PDU includes a plurality of PDCP PDUs belonging to a same synchronization sequence, and the first node may further send a sequence number of each PDCP PDU in the synchronization sequence and/or a sum of sizes of all PDCP PDUs in the synchronization sequence before each PDCP PDU, to sort the PDCP PDUs in the synchronization sequence. According to this method, a receive end may determine a sending sequence of data packets based on such sorting, to further determine whether a packet loss occurs.

In a possible design, the first node may further receive a first request from a third node. The first request is used to request data of a first service, and the data of the first service is synchronously sent by the second node and the third node to the UE. The first node may further send third target sending time information, a third PDCP PDU, and a fourth PDCP PDU to the third node. The fourth PDCP PDU is located before the third PDCP PDU, an end part bit of the fourth PDCP PDU and the third PDCP PDU correspond to a same MAC PDU, the third target sending time information indicates a sending time point of the third PDCP PDU, the third PDCP PDU is a $1^{st}$ data packet whose sending time point is after a first moment, and the first moment is a moment at which the first node receives the first request. In this design, the first node may send, as soon as possible to the third node that newly joins synchronous transmission, data that needs to be synchronously transmitted, to implement an emergency joining manner of synchronous transmission.

In a possible design, the first node receives second sending status information from the second node, to determine information indicating that the third PDCP PDU and the fourth PDCP PDU correspond to a same MAC PDU. The first node determines, based on the second sending status information, that the third PDCP PDU is the $1^{st}$ data packet whose sending time point is after the first moment. According to this method, the master control node may determine a data packet that needs to be sent to the third node.

In a possible design, the first node sends fourth target sending time information to the second node. The fourth target sending time information indicates a sending time point of the third PDCP PDU. The first node sends the third target sending time information to the second node. The third target sending time information further indicates a sending time point of the third PDCP PDU, and the sending time point that is of the third PDCP PDU and that is indicated by the fourth target sending time information is different from the sending time point indicated by the third target sending time information. According to this method, the master control node may adjust a target sending time point that has been sent to the second node, to implement synchronous data sending with the third node.

In a possible design, the first node receives a second request from the third node. The second request is used to request data of a second service, and the data of the second service is synchronously sent by the second node and the third node to the UE. The first node sends fifth target sending time information and a fifth PDCP PDU to the third node. The fifth target sending time information indicates a sending time point of the fifth PDCP PDU, the fifth PDCP PDU is a $1^{st}$ PDCP PDU whose sending time point is after a second moment and whose sending time point is at a start location of a MAC PDU, and the second moment is a moment at which the first node receives the second request. According to this method, the master control node may determine the data packet that needs to be sent to the third node.

In a possible design, the first node receives third sending status information from the second node. The third sending status information is used to determine that the sending time point of the fifth PDCP PDU is at a start location of a MAC PDU of the second node. The first node determines, based on the third sending status information, that the fifth PDCP PDU is a 1st PDCP PDU whose sending time point is after the second moment and whose sending time point is at the start location of the MAC PDU of the second node. In this design, after receiving a joining request, the first node may send, to the third node that newly joins synchronous transmission, a $1^{st}$ PDCP PDU that is of the second node and that is aligned with the MAC PDU, to implement a non-emergency joining manner of synchronous transmission.

According to a second aspect, a communication method is provided. The method may be implemented by a second node, and the second node may be a slave node of synchronous transmission. The method includes: The second node may receive first target sending time information from a first node. The first target sending time information indicates a sending time point of a first packet data convergence protocol PDCP protocol data unit PDU, and the sending time point of the first PDCP PDU indicates a time point at which the second node is to send the first PDCP PDU to UE. The second node may further send first sending status information to the first node. The first sending status information is associated with the first PDCP PDU. The second node may further receive second target sending time information from the first node. The second target sending time information indicates a sending time point of the second PDCP PDU, the sending time point of the second PDCP PDU indicates a time point at which the second node is to send the second PDCP PDU to the UE, and the second target sending time information is determined based on the first sending status information.

In a possible design, the second node may further receive first indication information, where the first indication information indicates that the first PDCP PDU needs to be synchronously sent by a plurality of nodes; and/or second indication information, where the second indication information indicates that the second PDCP PDU needs to be synchronously sent by a plurality of nodes.

In a possible design, the second node may further receive at least one of the following information: an identifier of the second node; information used to request the first sending status information; sending condition information of the first sending status information; third indication information, where the third indication indicates whether the first PDCP PDU includes a plurality of PDCP PDUs belonging to a same synchronization sequence; or fourth indication information, where the fourth indication indicates whether the second PDCP PDU includes a plurality of PDCP PDUs belonging to a same synchronization sequence.

In a possible design, the first PDCP PDU includes a plurality of PDCP PDUs belonging to a same synchronization sequence, and the second node may further receive a sequence number of each PDCP PDU in the synchronization sequence and/or a sum of sizes of all PDCP PDUs in the synchronization sequence before each PDCP PDU.

In a possible design, the second node may further send second sending status information, to determine information indicating that a third PDCP PDU and a fourth PDCP PDU correspond to a same MAC PDU.

In a possible design, the second node may further receive fourth target sending time information. The fourth target sending time information indicates a sending time point of the third PDCP PDU. The second node may further receive third target sending time information. The third target sending time information further indicates a sending time point of the third PDCP PDU, the sending time point that is of the third PDCP PDU and that is indicated by the fourth target sending time information is different from the sending time point indicated by the third target sending time information, and the third target sending time information is determined based on the second sending status information.

In a possible design, the second node may further send the second sending status information, to determine that a sending time point of a fifth PDCP PDU is located at a start location of a MAC PDU of the second node.

According to a third aspect, a communication method is provided. The method may be implemented by a third node, and the third node may be a slave node that is different from a second node and that newly joins synchronous transmission that is performed by the second node. The method includes: The third node may send a first request to a first node. The first request is used to request data of a first service, and the data of the first service is synchronously sent by the second node and the third node to UE. The third node may further receive third target sending time information, a third PDCP PDU, and a fourth PDCP PDU from the first node. The fourth PDCP PDU is located before the third PDCP PDU, an end part bit of the fourth PDCP PDU and the third PDCP PDU correspond to a same MAC PDU, the third target sending time information indicates a sending time point of the third PDCP PDU, the third PDCP PDU is a $1^{st}$ data packet whose sending time point is after a first moment, and the first moment is a moment at which the first node receives the first request.

According to a fourth aspect, a communication method is provided. The method may be implemented by a third node, and the third node may be a slave node that is different from a second node and that newly joins synchronous transmission that is performed by the second node. The method includes: The third node may send a second request to a first node. The second request is used to request data of a second service, and the data of the second service is synchronously sent by the second node and the third node to UE. The third node may further receive fifth target sending time information and a fifth PDCP PDU from the first node. The fifth target sending time information indicates a sending time point of the fifth PDCP PDU, the fifth PDCP PDU is a 1st PDCP PDU whose sending time point is after a second moment and whose sending time point is at a start location of a MAC PDU, and the second moment is a moment at which the first node receives the second request.

With reference to any one of the first aspect to the fourth aspect or the possible designs of the first aspect to the fourth aspect, in a possible design, the first sending status information indicates a sending completion time point of the first PDCP PDU, or the first sending status information indicates to increase a sending interval between PDCP PDUs, or the first sending status information indicates to reduce a sending interval between PDCP PDUs.

With reference to any one of the first aspect to the fourth aspect or the possible designs of the first aspect to the fourth aspect, in a possible design, the first sending status information specifically includes at least one of the following: information used to determine a correspondence between the first PDCP PDU and a MAC PDU; segmentation information of the first PDCP PDU; concatenation information of the first PDCP PDU; information indicating whether sending of the first PDCP PDU is completed; or resource utilization information.

With reference to any one of the first aspect to the fourth aspect or the possible designs of the first aspect to the fourth aspect, in a possible design, the first PDCP PDU includes one PDCP PDU or includes a plurality of PDCP PDUs belonging to a same synchronization sequence. In this design, the first node may perform synchronous sending control on a PDCP PDU at different granularities based on a service requirement, a UE attribute, and the like.

With reference to any one of the first aspect to the fourth aspect or the possible designs of the first aspect to the fourth aspect, in a possible design, the first PDCP PDU includes a plurality of PDCP PDUs belonging to a same synchronization sequence, the synchronization sequence is one in a synchronization sequence group continuously sent by the first node, and the first target sending time information specifically indicates a sending time point of a $1^{st}$ synchronization sequence in the synchronization sequence group and a sending interval between synchronization sequences in the synchronization sequence group. In this design, the first node may perform synchronous data sending by using a synchronization sequence.

According to a fifth aspect, a communication apparatus is provided. For example, the communication apparatus is the foregoing first node, second node, or third node. The first communication apparatus is configured to perform the method performed by the first node, the second node, or the third node in any one of the first aspect to the fourth aspect or the possible designs of the first aspect to the fourth aspect. Specifically, the communication apparatus may include a module configured to perform the method in any one of the first aspect to the fourth aspect or the possible designs of the first aspect to the fourth aspect, for example, include a processing module and a communication module. For example, the communication module may include a sending module and a receiving module. The sending module and the receiving module may be different functional modules, or may be a same functional module that can implement different functions. For example, the communication apparatus is a communication device, or a chip or another component disposed in the communication device. For example, the communication device is a network device or an access network device (for example, a base station).

The following provides an example in which the communication apparatus is a network device or an access network device. For example, the communication module may be implemented by using a transceiver, and the processing module may be implemented by using a processor. Alternatively, the sending module may be implemented by using a transmitter, and the receiving module may be implemented by using a receiver. The transmitter and the receiver may be different functional modules, or may be a same functional module that can implement different functions. If the communication apparatus is a communication device, the transceiver is implemented, for example, by using a communication interface in the communication device. Alternatively, if the communication apparatus is a chip disposed in the communication device, the transceiver (or the transmitter and the receiver) is, for example, an interface circuit in the chip.

According to a sixth aspect, a communication system is provided. The communication system includes a communication apparatus configured to perform the method shown in any one of the first aspect and the possible designs of the first aspect and a communication apparatus configured to perform the method shown in any one of the second aspect and the possible designs of the second aspect.

In a possible design, the communication system may further include a communication apparatus that performs the method shown in the third aspect or the fourth aspect.

According to a seventh aspect, a computer-readable storage medium is provided. The computer-readable storage medium is configured to store computer instructions. When the computer instructions run on a computer, the computer is enabled to perform the method in any one of the first aspect to the fourth aspect or the possible designs of the first aspect to the fourth aspect.

According to an eighth aspect, a computer program product including instructions is provided. The computer program product is configured to store computer instructions, and when the computer instructions run on a computer, the computer is enabled to perform the method in any one of the first aspect to the fourth aspect or the possible implementations of the first aspect to the fourth aspect.

According to a ninth aspect, a circuit is provided. The circuit is coupled to a memory, and the circuit is configured to read and execute a program stored in the memory, to perform the method in any one of the first aspect to the fourth aspect or the possible implementations of the first aspect to the fourth aspect.

For beneficial effects of the method shown in the second aspect to the ninth aspect and the possible designs of the second aspect to the ninth aspect, refer to beneficial effects of the first aspect and the possible designs of the first aspect.

DESCRIPTION OF EMBODIMENTS

Figures 1, 2:
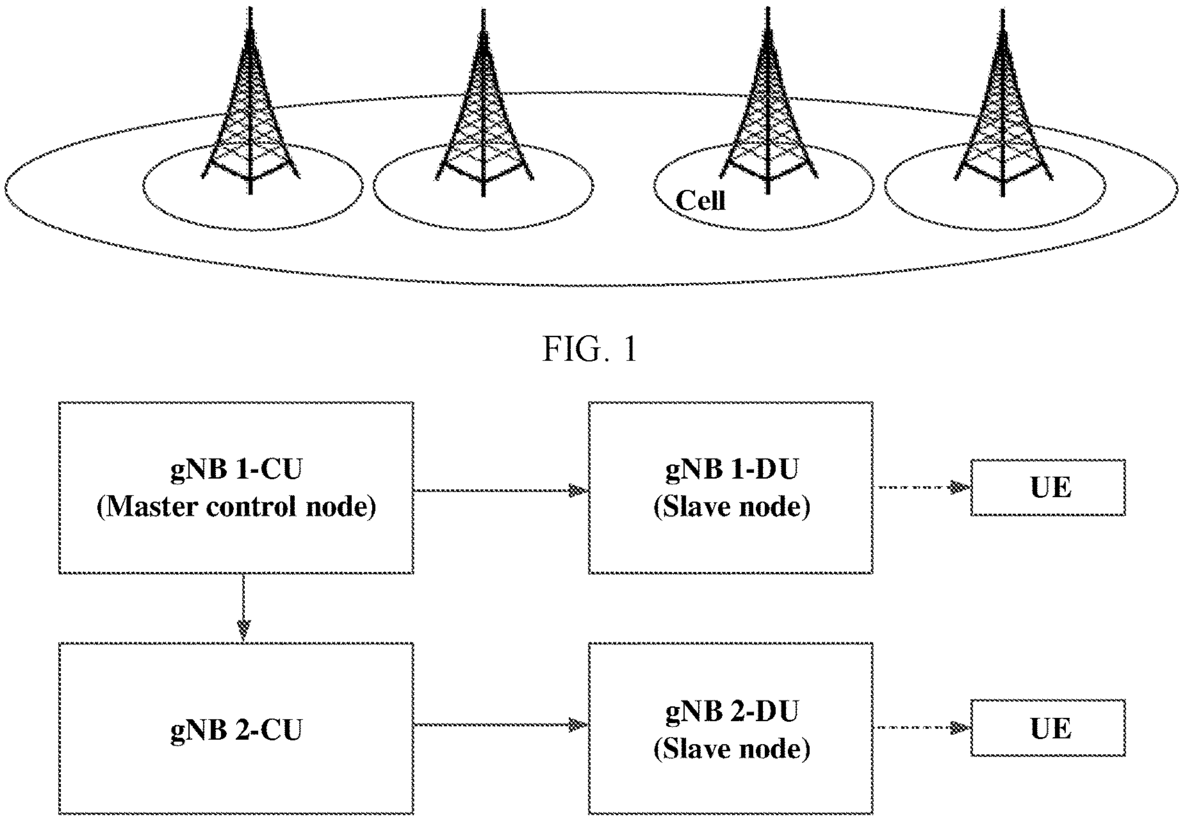
FIG. 1 is a schematic diagram of an architecture of a communication system according to an embodiment of this application.
FIG. 2 is a schematic diagram of an architecture of another communication system according to an embodiment of this application.

To make the objectives, technical solutions, and advantages of this application clearer, the following further describes this application in detail with reference to the accompanying drawings.

The following describes some terms in embodiments of this application, to facilitate understanding of a person skilled in the art.

(1) A terminal apparatus is, for example, a terminal device or a module, for example, a chip system, configured to implement a function of the terminal device. The chip system may be disposed in the terminal device. The terminal device includes a device that provides data connectivity for a user, and specifically includes the device that provides data connectivity for the user, or includes the device that provides data connectivity for the user. For example, the terminal device may include a handheld device with a wireless connection function, or a processing device connected to a wireless modem. The terminal device may communicate with a core network by using a radio access network (RAN), and exchange data with the RAN, or exchange data with the RAN. The terminal device may include user equipment, a wireless terminal device, a mobile terminal device, a device-to-device communication (D2D) terminal device, a V2X terminal device, a machine-to-machine/machine type communication (M2M/MTC) terminal device, and an internet of things (IoT) terminal device.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on the body or integrated into clothes or an accessory of a user. The wearable device is not only a hardware device, but also implements a powerful function through software support, data exchange, and cloud interaction. In a broad sense, wearable intelligent devices include a full-featured and large-sized device that can implement all or a part of functions without depending on a smartphone, for example, a smart watch or smart glasses, and include a device that is dedicated to only one type of application function and need to collaboratively work with another device such as a smartphone, for example, various smart bands, smart helmets, or smart jewelry for monitoring a physical sign.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (on-board unit, OBU). In embodiments of this application, the terminal device may further include a relay (relay). Alternatively, it may be understood that all devices that can perform data communication with a base station may be considered as terminal devices.

In the following, the user equipment may be used as an example for description. The user equipment may also be replaced with a terminal apparatus, a terminal device, or the like.

(2) A network device includes, for example, an access network (AN) device. The access network device may include but is not limited to a next-generation NodeB (gNB) in 5G, an evolved nodeB (eNB) in LTE, a radio network controller (radio network controller, RNC), a radio controller in a cloud radio access network (CRAN) system, a base station controller (BSC), a home evolved nodeB (home nodeB, HNB), a baseband unit (BBU), a transmitting and receiving point (TRP), a transmitting point (TP), a mobile switching center, and a base transceiver station (BTS) in a global system for mobile communication (GSM) or code division multiple access (CDMA) network, or may be a node base station (NB) in wideband code division multiple access (WCDMA), or may be an evolved NB (eNB or eNodeB) in LTE, or may be a base station device in a future 5G network or an access network device in a future evolved PLMN network, or may be a wearable device or a vehicle-mounted device.

A terminal apparatus may communicate with an example device through an air interface. For example, the terminal apparatus and the network device transmit air interface signaling and data such as a radio resource control (RRC) message and downlink control information (DCI) through an air interface.

It should be understood that the access network device may further communicate with another network device through an interface. The access network device may communicate with another access network device through an interface between the access network devices; and/or the access network device may communicate with a core network device through an interface between the access network device and the core network device, for example, receive data from a core network. A manner in which the access network device communicate with another network device is not specifically limited in this application.

Because embodiments of this application mainly relate to an access network device, the network device described below is an access network device unless otherwise specified. In the following, a base station may represent the network device and/or the access network device.

In some deployment manners, the network device may include a central unit (CU) and a distributed unit (DU). The CU and the DU may be deployed as one network node, which is referred to as centralized deployment; or are separately deployed as independent network nodes, which is referred to as distributed deployment. In this case, the CU and the DU may communicate with each other through an F1 interface between the CU and the DU. Interfaces between the CU and the DU include the F1 interface and another interface between the CU and the DU. The access network device may further include an active antenna unit (AAU).

The CU may implement some functions of the network device, and the DU may implement some functions of the network device. For example, the CU is responsible for processing a non-real-time protocol and service, and implements a function of an RRC layer or a packet data convergence protocol (PDCP) layer. In a possible structure, the CU may include a control panel (CP) and a user panel (UP). The CP and the UP communicate with each other through an E1 interface.

The DU may be responsible for processing a physical layer protocol and a real-time service, and implements functions of a radio link control (RLC) layer, a media access control (MAC) layer, and a physical (PHY) layer. The AAU may be configured to implement some physical layer processing functions, radio frequency processing, and a function related to an active antenna. Information at the RRC layer eventually becomes information at the PHY layer, or is converted from information at the PHY layer. Therefore, in this architecture, higher-layer signaling such as RRC layer signaling may also be considered as being sent by the DU or sent by the DU and the AAU. It may be understood that the access network device 102 may be a device including one or more of the CU, the DU, or the AAU. In addition, the CU may be classified as a device in an access network, or the CU may be used as an access network device. Alternatively, the CU may be classified into a device in a core network CN), or the CU may be used as a core network device. This is not limited in this application.

In embodiments of this application, an apparatus configured to implement a function of the network device may be a network device, or may be an apparatus, for example, a chip system, that can support the network device to implement the function. The apparatus may be installed in the network device. In the following, the network device may be described by using the base station as an example.

In a current MBSFN technology, a same time-frequency resource is used when different base stations send an MBMS service, and a plurality of base stations send same data on a same time-frequency resource. To be specific, all the plurality of base stations send a data packet 0 on a resource 0, and send a data packet 1 on a resource 1. In this way, the plurality of base stations send MBMS data as if one base station sends the MBMS data. If a UE is located at an edge of coverage of a cell, the UE may receive signals of the current cell and a neighboring cell. Because the MBMS data is sent on a same time-frequency resource, the UE may receive a superimposed MBMS data signal sent by two or more cells, to improve sending reliability of the MBMS data.

To ensure that same data is sent on a same resource, a master control node may control generation of a timestamp of a data packet, and send the timestamp of the data packet to a slave node, to ensure synchronization of data sending between a plurality of slave nodes.

A current LTE system supports a synchronization protocol. Specifically, in the LTE system, a multicast broadcast service center (BM-SC) may send an MBMS data packet to UE through an MBMS gateway and an eNB. When sending the MBMS data packet to the eNB, the BM-SC attaches a time label (timestamp) to each data packet. The time label may be considered as one type of timestamp. The BM-SC needs to send a same data packet to a plurality of eNBs, and the same data packet arrives at different eNBs at different time points, but the same data packet is associated with a same time label. For example, the time label indicates a time point at which the eNB sends the data packet. In this way, different eNBs send a same data packet at a same time point, so that different data packets are sent on a same time-frequency resource. In this manner, the BM-SC and/or the MBMS gateway may be considered as a master control node, and the plurality of eNBs may be considered as slave nodes.

For a plurality of data packets belonging to a same synchronization sequence, a value of the time label field is a time point at which a synchronization cycle starts, the time point is a sending time point of a $1^{st}$ data packet in the synchronization sequence, and the synchronization cycle is a cycle of the plurality of data packets in the synchronization sequence. An elapsed octet counter is a value of a quantity of bytes of MBMS data transmitted from a start of a synchronization cycle to a current moment. The value is a size of all data in a same synchronization cycle before a current data packet, that is, a sum of sizes of payload fields. For example, if a size of a payload field of a $1^{st}$ packet is 100 bytes (octets/bytes) and a size of a payload field of a $2^{nd}$ packet is 150 bytes, a value that is of the elapsed octet counter and that is carried in the $3^{rd}$ packet is 250. A value of the elapsed octet counter of the $1^{st}$ packet is 0.

In addition, in an NR scenario, a master control node generates a PDCP PDU corresponding to data packets that need to be sent synchronously, adds a timestamp to each PDCP PDU, and sends the PDCP PDU to a slave node. Therefore, the timestamp can be indicated at a granularity of a PDCP PDU. As shown in FIG. 2, the master control node herein may be a CU of a gNB 1, and the slave node may include a DU of the gNB 1, a DU of a gNB2, or the like. An arrow direction in FIG. 2 may represent a data transmission direction. In addition, the master control node may alternatively be a gNB, and the slave node may be another gNB or a DU of the another gNB. This is not specifically limited.

However, in NR, when the timestamp is indicated at the granularity of a PDCP PDU, a sending time point that is of a PDCP PDU and that is indicated by the master control node is inconsistent with a time point at which the slave node actually sends a MAC PDU corresponding to the PDCP PDU to user equipment, and a packet loss may be caused.

Figure 3:
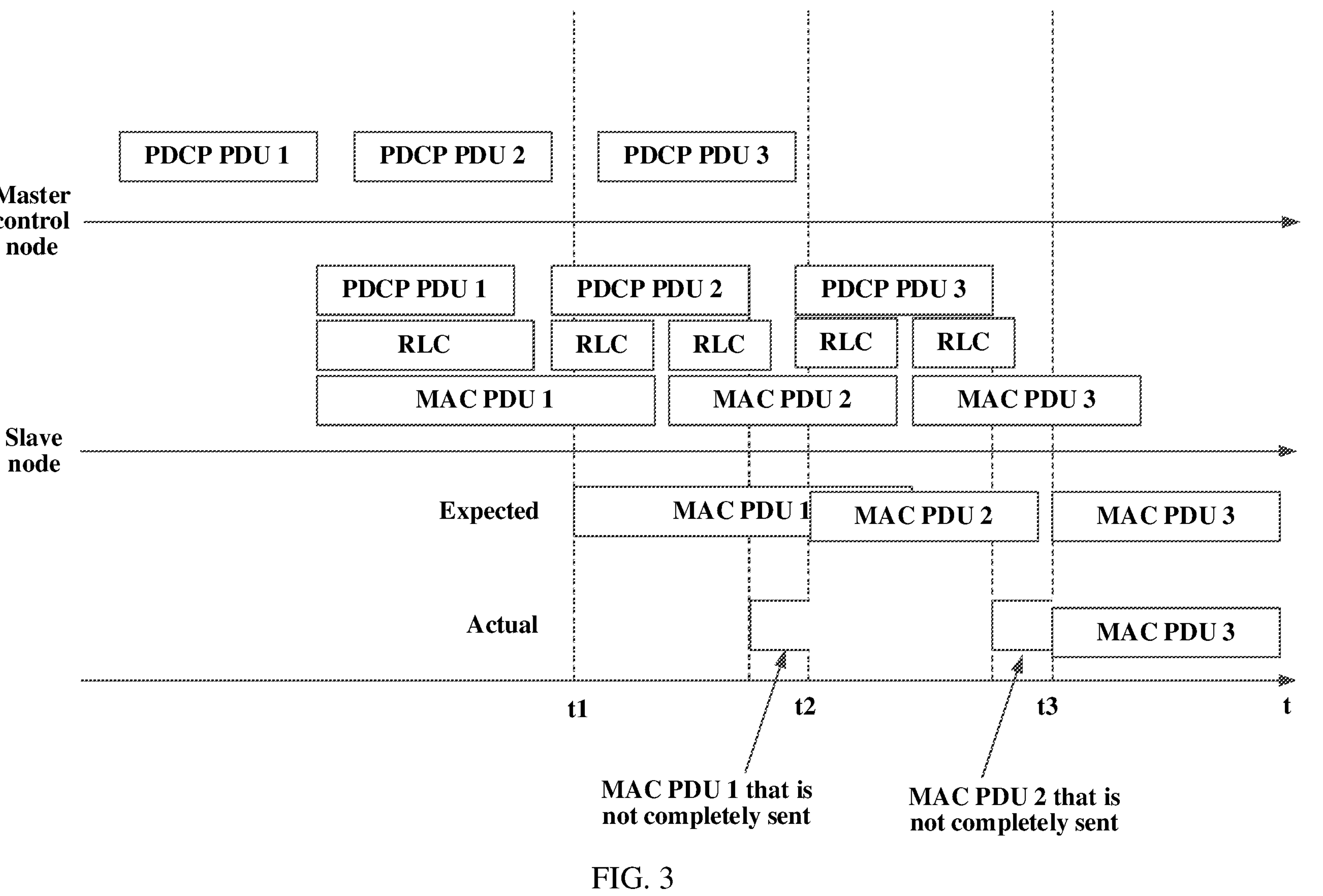
FIG. 3 is a schematic diagram of a time domain of a synchronous data sending process according to an embodiment of this application.

For example, when performing a concatenation operation on a plurality of PDCP PDUs, the slave node needs send, after all PDCP PDUs are received, a MAC PDU obtained through concatenation. Consequently, the PDCP PDU cannot be sent at the sending time point indicated by the master control node, and a packet loss occurs. As shown in FIG. 3, the master control node expects that a PDCP PDU 1 needs to be sent at a moment t1. However, due to a concatenation operation, the slave node needs to send, after receiving a PDCP PDU 2, a MAC PDU 1 generated based on the PDCP PDU 1 and the PDCP PDU 2. Consequently, a time point at which the MAC PDU 1 is sent exceeds the moment t1. For example, before a moment t2 (a moment that is indicated by the master control node and at which the PDCP PDU 2 is sent), because the MAC PDU 1 is not sent completely, the MAC PDU 1 is discarded because the slave node may send a MAC PDU 2 starting from the moment t2, or the MAC PDU 2 may be discarded because the MAC PDU 1 continues to be sent. Similarly, subsequently, it is expected that the PDCP PDU 2 needs to be sent at the moment t2. Due to a concatenation operation, the slave node needs to send, after receiving a PDCP PDU 3, the MAC PDU 2 generated based on the PDCP PDU 2 and the PDCP PDU 3. Consequently, the MAC PDU 2 may not be sent completely. In other words, a packet loss occurs. Consequently, data transmission reliability is reduced, and resource utilization is reduced.

To improve reliability of a synchronous data transmission mechanism in NR, an embodiment of this application provides a communication method. The method may be implemented by a first node and a second node. The first node may also be referred to as a master control node, and the second node may be referred to as a slave node, an assisted node, or the like. The first node may be configured to: determine a sending time point of a data packet, and indicate the sending time point to the second node. The second node may send the data packet at the sending time point indicated by the first node.

According to the method, the first node may determine a sending time point of a second PDCP PDU based on first sending status information from the second node, where the first sending status information is associated with a first PDCP PDU, so that the first node can adjust the sending time point of the second PDCP PDU based on a sending situation of the first PDCP PDU, to avoid too many packet losses caused when a MAC PDU of the second PDCP PDU is not completely sent in a timely manner due to splitting and concatenation of the second PDCP PDU and a subsequent PDCP PDU, so as to improve reliability of the synchronous data transmission mechanism in NR, and improve resource utilization.

Figure 4:
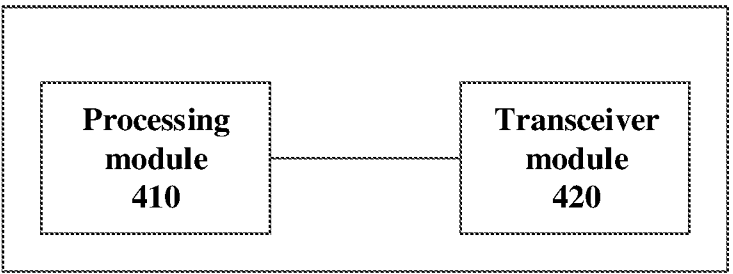
FIG. 4 is a schematic diagram of a structure of a communication apparatus according to an embodiment of this application.
Figure 5:
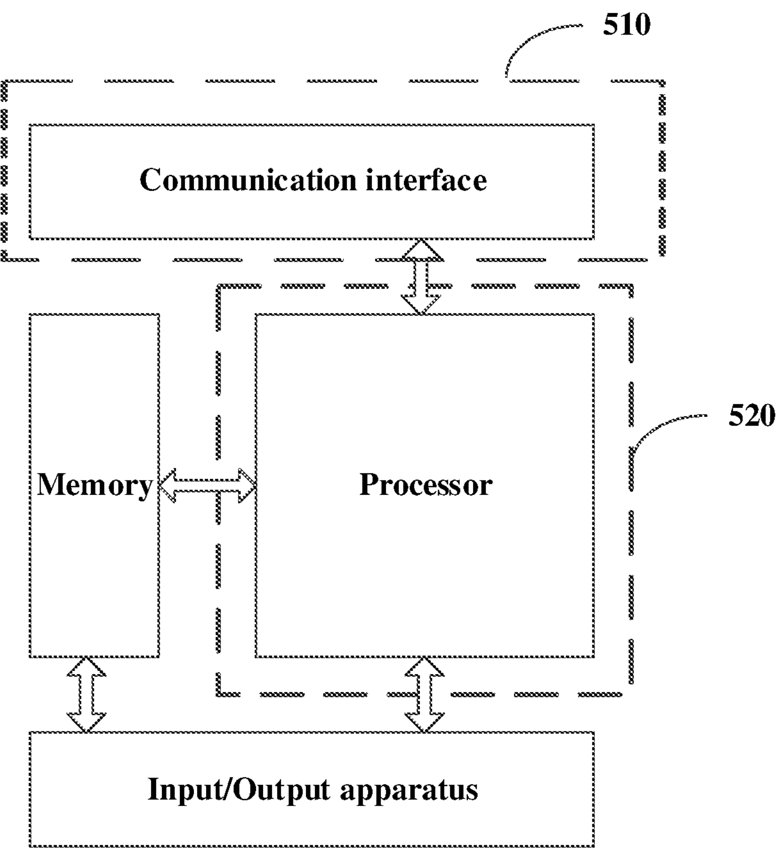
FIG. 5 is a schematic diagram of a structure of another communication apparatus according to an embodiment of this application.

FIG. 4 and FIG. 5 each are a schematic diagram of a structure of a communication apparatus according to an embodiment of this application. The communication apparatus is configured to implement a communication method provided in embodiments of this application. It should be understood that the communication apparatus may be configured to implement at least one of a first node, a second node, or a third node.

For example, FIG. 4 is a schematic diagram of a structure of a possible communication apparatus. The structure may include a processing module (or a processing unit) 410 and a transceiver module (or a transceiver unit) 420. For example, the structure shown in FIG. 4 may be at least one of a first node, a second node, or a third node, or may be a chip applied to at least one of the first node, the second node, or the third node, or another combined device, component (or assembly), or the like that has at least one function of the first node, the second node, or the third node shown in this application. When the structure is at least one of the first node, the second node, or the third node, the transceiver module 420 may be a transceiver, the transceiver may include a communication interface (for example, an F1 interface), and the like, and the processing module 410 may be a processor, for example, includes one or more central processing units (central processing unit, CPU). When the structure is a component that has at least one function of the first node, the second node, or the third node shown in this application, the transceiver module 420 may be a communication interface, and the processing module 410 may be a processor. When the structure is a chip system, the transceiver module 420 may be an input/output interface of a chip (for example, a baseband chip), and the processing module 410 may be a processor of the chip system, and may include one or more central processing units. It should be understood that the processing module 410 in this embodiment of this application may be implemented by a processor or a processor-related circuit component, and the transceiver module 420 may be implemented by a transceiver or a transceiver-related circuit component.

For example, the processing module 410 may be configured to perform all operations other than a receiving/sending operation that are performed by at least one of the first node, the second node, or the third node in any embodiment of this application, for example, a processing operation, and/or configured to support another process of a technology described in this specification, for example, generate a message, information, and/or signaling sent by the transceiver module 420, and process a message, information, and/or signaling received by the transceiver module 420. The transceiver module 420 may be configured to perform all receiving and sending operations performed by at least one of the first node, the second node, or the third node in any embodiment of this application, and/or configured to support another process of the technology described in this specification, for example, data sending and/or receiving.

In addition, the transceiver module 420 may be a functional module, and the functional module can complete both a sending operation and a receiving operation. For example, the transceiver module 420 may be configured to perform all sending operations and receiving operations performed by at least one of the first node, the second node, or the third node. For example, when performing a sending operation, the transceiver module 420 may be considered as a sending module, and when performing a receiving operation, the transceiver module 420 may be considered as a receiving module. Alternatively, the transceiver module 420 may be two functional modules, and the transceiver module 420 may be considered as a general term of the two functional modules. The two functional modules are a sending module and a receiving module. The sending module is configured to complete a sending operation. For example, the sending module may be configured to perform all sending operations performed by at least one of the first node, the second node, or the third node. The receiving module is configured to complete a receiving operation. The receiving module may be configured to perform all receiving operations performed by at least one of the first node, the second node, or the third node.

FIG. 5 is a schematic diagram of a structure of another communication apparatus. The communication apparatus is configured to perform an action performed by at least one of a first node, a second node, or a third node according to embodiments of this application. For ease of understanding and illustration, as shown in FIG. 5, the communication apparatus may include a processor, a memory, and a communication interface. The processor is mainly configured to: process a communication protocol and communication data, control the communication apparatus, execute a software program, process data of the software program, and the like. The memory is mainly configured to store the software program and data. The communication interface is mainly used for communication between the first node and the second node.

The communication apparatus may further include an antenna and a radio frequency circuit, configured to communicate with UE in a wireless communication manner, for example, send downlink data. When data needs to be sent to the UE, the processor of the communication apparatus may further perform baseband processing on to-be-sent data, and output a baseband signal to the radio frequency circuit. After performing radio frequency processing on the baseband signal, the radio frequency circuit sends the radio frequency signal in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor. The processor converts the baseband signal into data, and processes the data.

In this embodiment of this application, a communication interface having a transceiver function may be considered as a transceiver unit of the communication apparatus. The transceiver unit may further include an antenna and/or a radio frequency circuit. The transceiver unit may be a functional unit, and the functional unit can implement a sending function and a receiving function. Alternatively, the transceiver unit may include two functional units: a receiving unit that can implement the receiving function and a sending unit that can implement the sending function. A processor having a processing function may be further considered as a processing unit of the communication apparatus. As shown in FIG. 5, the communication apparatus may include a transceiver unit 510 and a processing unit 520. The transceiver unit may alternatively be referred to as a transceiver, a transceiver machine, a transceiver apparatus, or the like. The processing unit may also be referred to as a processor, a processing board, a processing module, a processing apparatus, or the like. Optionally, a component that is in the transceiver unit 510 and that is configured to implement the receiving function may be considered as a receiving unit, and a component that is in the transceiver unit 510 and that is configured to implement the sending function may be considered as a sending unit. That is, the transceiver unit 510 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 510 may correspond to a transceiver module 420, or a transceiver module 420 may be implemented by the transceiver unit 510. The transceiver unit 510 is configured to perform a sending operation and a receiving operation of the first node and/or the second node in embodiments shown in this application, and/or configured to support another process of a technology described in this specification. The processing unit 520 may correspond to a processing module 410, or a processing module 410 may be implemented by the processing unit 520. The processing unit 520 is configured to perform an operation, other than the receiving/sending operation, performed by the first node and/or the second node in embodiments of this application, for example, is configured to perform all operations, other than receiving and sending, performed by the first node and/or the second node in embodiments of this application, and/or is configured to support another process of the technology described in this specification.

For ease of description, FIG. 5 shows only one memory and one processor. In an actual communication apparatus, there may be one or more processors and one or more memories. The memory may also be referred to as a storage medium, a storage device, or the like. The memory may be disposed independent of the processor, or may be integrated with the processor. This is not limited in embodiments of this application.

Figure 6:
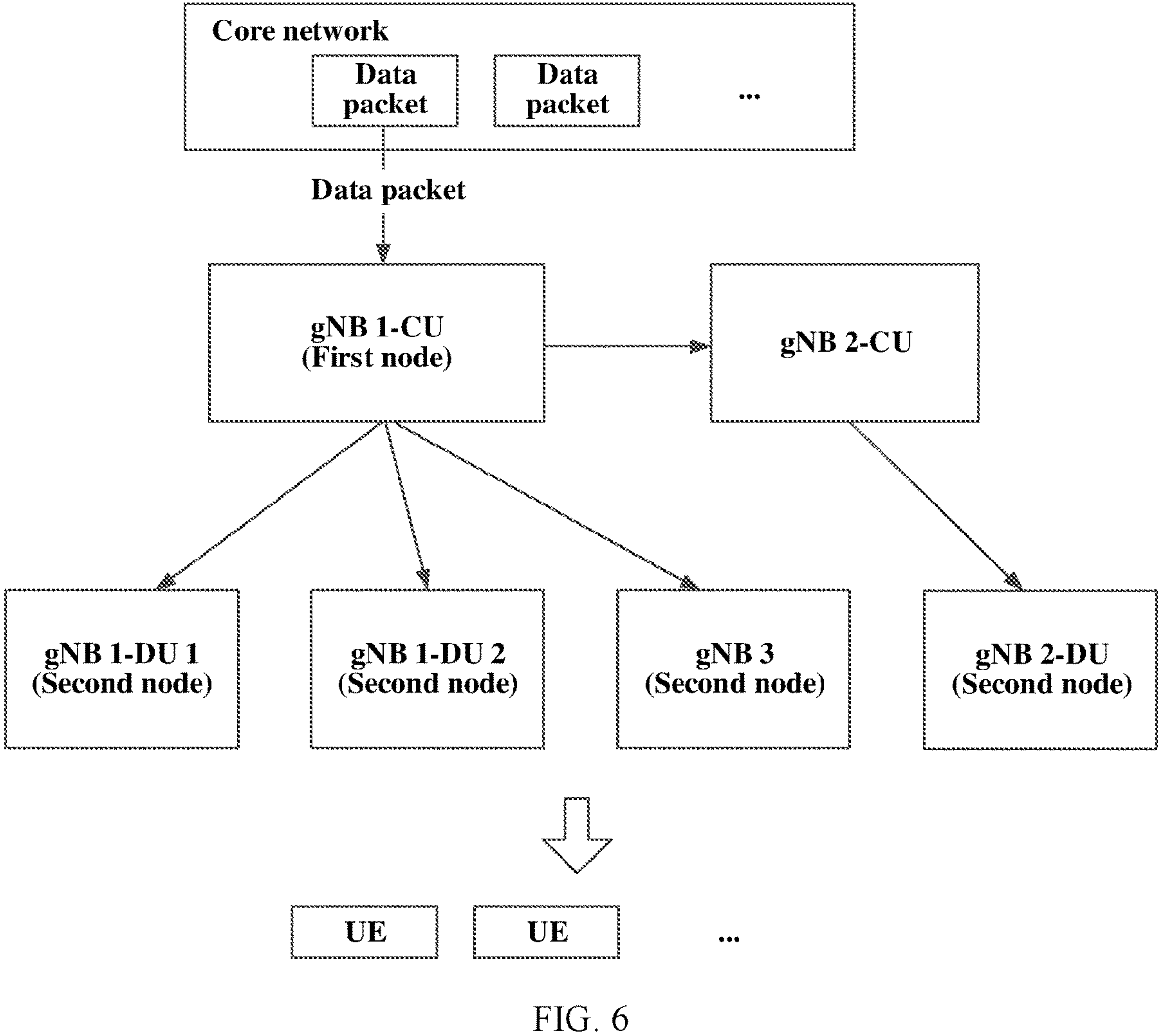
FIG. 6 is a schematic diagram of an architecture of another communication system according to an embodiment of this application.
Figure 7:
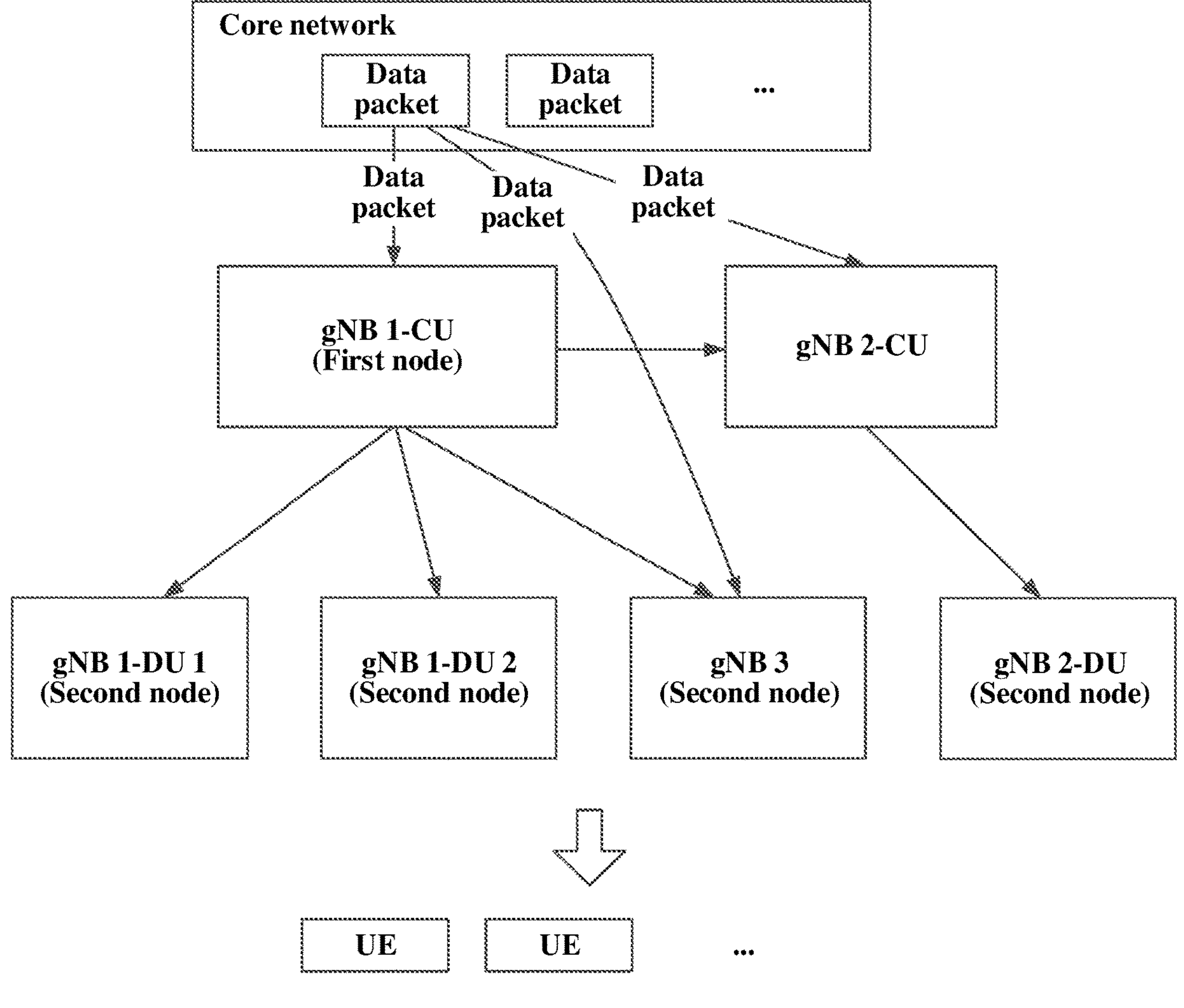
FIG. 7 is a schematic diagram of an architecture of another communication system according to an embodiment of this application.

FIG. 6 and FIG. 7 each are a diagram of an architecture of another communication system, or each show a possible application scenario of the first node and the second node. As shown in FIG. 6, the first node may obtain, from a core network, data that needs to be synchronously sent, and the first node determines a sending time point of a PDCP PDU. Then, the first node sends the PDCP PDU and the sending time point corresponding to the PDCP PDU to at least one second node, and the at least one second node synchronously sends the PDCP PDU at the sending time point corresponding to the PDCP PDU. Alternatively, as shown in FIG. 7, the first node and at least one second node may separately obtain, from a core network, data that needs to be synchronously sent, and the first node determines a sending time point of a PDCP PDU. Then, the first node sends the sending time point corresponding to the PDCP PDU to the at least one second node, and the at least one second node synchronously sends the PDCP PDU at the sending time point corresponding to the PDCP PDU.

It should be understood that an action of one second node is used as an example for description in this application. A plurality of second nodes shown in FIG. 6 or FIG. 7 may perform same or similar operations based on an actual requirement.

Figure 8:
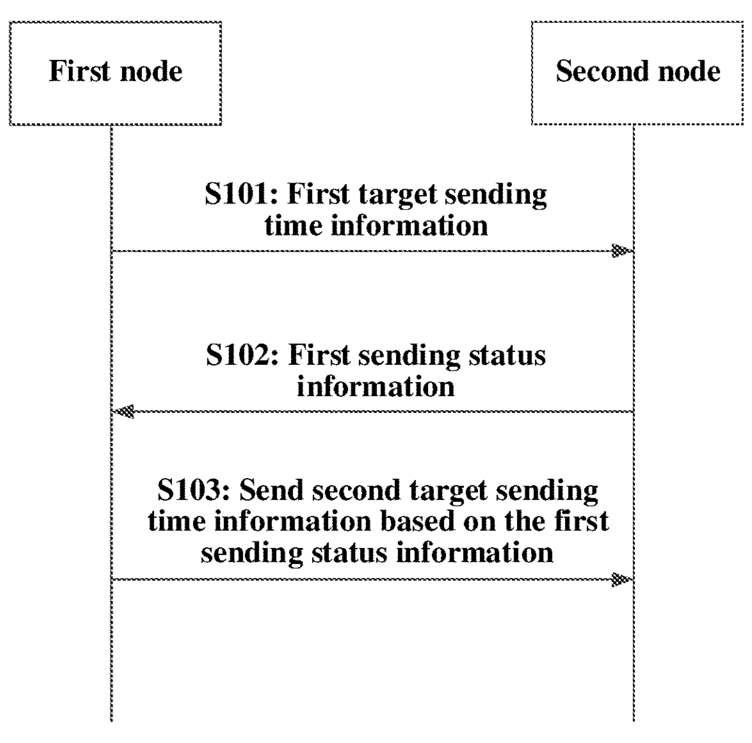
FIG. 8 is a schematic flowchart of a communication method according to an embodiment of this application.

The following describes a communication method provided in an embodiment of this application with reference to FIG. 8.

S101: A first node sends first target sending time information to a second node, where the first target sending time information indicates a sending time point of a first PDCP PDU. It should be understood that, unless otherwise specified, a sending time point of a PDCP PDU in this application is a time point at which the second node starts to send the PDCP PDU to UE. For example, the second node may send a MAC PDU corresponding to the first PDCP PDU at the sending time point indicated by the first target sending time information. The first target sending time information may be generated by the first node.

Optionally, the first PDCP PDU may include one PDCP PDU, or include a plurality of PDCP PDUs belonging to a same synchronization sequence. If the PDCP PDU is sent by using a synchronization sequence, any synchronization sequence may include a plurality of PDCP PDUs. Optionally, a time interval between sending time points of two adjacent synchronization sequences remains unchanged.

Figure 9:
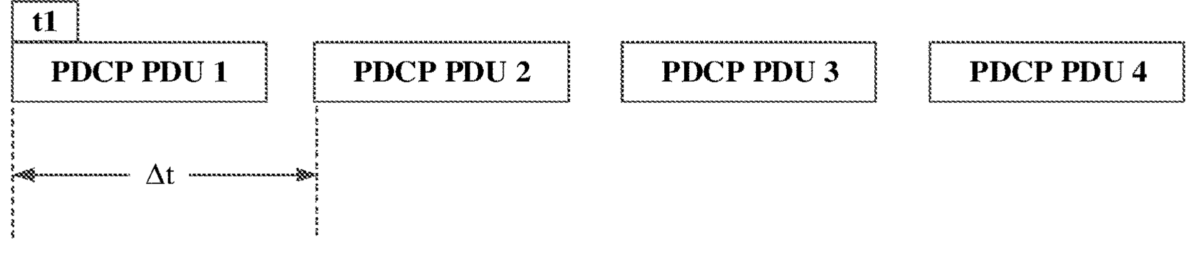
FIG. 9 is a schematic diagram of an indication manner of sending time information according to an embodiment of this application.

As shown in FIG. 3, the second node may receive a PDCP 1, a PDCP 2, and a PDCP 3, and it may be considered that the PDCP 1, the PDCP 2, and the PDCP 3 are three first PDCP PDUs. The first node may indicate respective sending time points t1, t2, and t3 of the PDCP 1, the PDCP 2, and the PDCP 3 to the second node. Information indicating t1, information indicating t2, and information indicating t3 are respectively first target sending time information of the PDCP 1, first target sending time information of the PDCP 2, and first target sending time information of the PDCP 3. Alternatively, as shown in FIG. 9, if a PDCP 1 and a PDCP 2 included in the first PDCP PDU belong to a same synchronization sequence, the first target sending time information may indicate a sending time point of a $1^{st}$ data packet in the synchronization sequence, that is, a sending time point of the PDCP PDU 1.

If the first PDCP PDU includes a plurality of PDCP PDUs belonging to a same synchronization sequence, the first node may further send a number of each PDCP PDU and/or a sum of sizes of PDCP PDUs in the synchronization sequence before each PDCP PDU to the second node, so that a slave node determines a sending sequence of the plurality of PDCP PDUs belonging to a same synchronization sequence. A sum that is of sizes of PDCP PDUs in the synchronization sequence and that is carried in the $1^{st}$ data packet in the synchronization sequence is 0.

For example, a data packet header of each PDCP PDU may carry a number of the PDCP PDU, and the number may be a new radio-user (NR-U) sequence number (SN), a PDCP PDU SN, or a ranking of the PDCP PDU in the synchronization sequence; and/or a data packet header of each PDCP PDU may carry cumulative bit information, and the cumulative bit information indicates a sum of sizes of all PDCP PDUs in the synchronization sequence before the PDCP PDU. The cumulative bit information may be indicated by using an elapsed octet counter. For example, a value indicated by cumulative bit information that may be carried in a packet header of the $1^{st}$ data packet in the synchronization sequence is 0, and a value indicated by a second data packet is a quantity of bytes of the $1^{st}$ data packet. The data packet herein is a PDCP PDU in the synchronization sequence.

The second node may further determine, based on a synchronization sequence number or the cumulative bit information that is indicated by the first node, a synchronization sequence to which a PDCP PDU belongs, to learn of the PDCP PDU in the synchronization sequence, and send the PDCP PDU at a sending time point of the synchronization sequence. Alternatively, a rule of a synchronization sequence may be considered by default. For example, two PDCP PDUs are used as a same sequence, and the second node may determine the synchronization sequence based on the rule.

The following describes a sending manner of the first target sending time information.

(1) A granularity of the first target sending time information is described, or a quantity of PDCP PDUs to which the first target sending time information is applicable is described. A sending granularity is related to a quantity of PDCP PDUs included in the first PDCP PDU.

If the first PDCP PDU is a PDCP PDU, the first target sending time information may be applied to the PDCP PDU. In other words, the first target sending time information may indicate the sending time point of the first PDCP PDU. For example, the first node may send respective first target sending time information of a plurality of PDCP PDUs to the second node, to indicate a time point at which the second node is to send each PDCP PDU. First target sending time information of all first PDCP PDUs is different.

For example, if the second node cyclically sends a plurality of PDCP PDUs, including but not limited to a PDCP PDU 1, a PDCP PDU 2, a PDCP PDU 3, and a PDCP PDU 4 shown in FIG. 9, each PDCP PDU may be used as the first PDCP PDU, and the first target sending time information may be used to determine a sending time point of each PDCP PDU.

If the first PDCP PDU includes a plurality of PDCP PDUs belonging to a same synchronization sequence, or the first PDCP PDU is a synchronization sequence, the first target time information may be applied to the synchronization sequence. In this case, a first target sending message may indicate a time point at which the slave node sends a $1^{st}$ data packet (the data packet may be replaced with a PDCP PDU) in the synchronization sequence. In this example, first target sending time information corresponding to the plurality of PDCP PDUs is the same.

Figure 10:
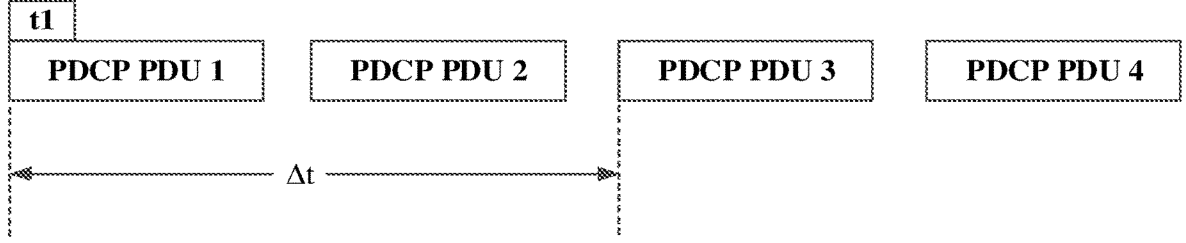
FIG. 10 is a schematic diagram of another indication manner of sending time information according to an embodiment of this application.

For example, the second node cyclically sends a plurality of synchronization sequences. FIG. 10 is used as an example. If a PDCP PDU 1 and a PDCP PDU 2 belong to a same synchronization sequence, and a PDCP PDU 3 and a PDCP PDU 4 belong to a same synchronization sequence, it may be considered that the two synchronization sequences belong to a same synchronization sequence group. Each synchronization sequence in the synchronization sequence group may be considered as a first PDCP PDU, and the synchronization sequence to which the PDCP PDU 1 and the PDCP PDU 2 belong is a $1^{st}$ synchronization sequence in the synchronization sequence group. In this case, the first target sending time information may indicate a sending time point of each synchronization sequence. The synchronization sequence including the PDCP PDU 1 and the PDCP PDU 2 is used as an example. The first target sending time information may indicate a time point at which the second node starts to send the PDCP PDU 1.

(2) A sending frequency of the first target sending time information is described.

In an implementation, the first target sending time information may be sent for each first PDCP PDU. To be specific, each time the second node sends one first PDCP PDU, the first node may send one piece of first target sending time information to the second node. The first PDCP PDU herein may include one PDCP PDU, or may include a plurality of PDCP PDUs belonging to a same synchronization sequence.

In another implementation, when the second node needs to cyclically send a plurality of first PDCP PDUs, the first target sending time information may be used to determine a start sending time point of the plurality of first PDCP PDUs and a time interval between sending time points of two adjacent first PDCP PDUs. The time interval may be directly indicated. For example, the first target sending time information may include information indicating the time interval. Alternatively, the time interval may be indirectly indicated. For example, the first target sending time information may include respective sending time points of two adjacent PDCP PDUs in the plurality of PDCP PDUs, and a difference between the two sending time points is the time interval.

For example, as shown in FIG. 9, if the second node needs to send a plurality of PDCP PDUs, the first node may send first target sending time information to the second node, to indicate a sending time point t1 of a PDCP PDU 1 (that is, a $1^{st}$ PDCP PDU in the plurality of PDCP PDUs) and indicate a time interval Δt between two adjacent PDCP PDUs. The second node may determine a sending time point of each PDCP PDU based on t1 and Δt. Herein, t1 and Δt may be carried in same information, a same field, same signaling, or a same message for sending. For example, both t1 and Δt are carried in a data packet header of the PDCP PDU 1. Alternatively, t1 and Δt may be separately sent, for example, carried in different information, fields, signaling, or messages for sending. This is not specifically limited in this application.

For another example, the first target sending time information may indicate a sending time point t1 of a PDCP PDU 1 shown in FIG. 9 and a sending time point t2 of a PDCP PDU 2. In this case, the second node may determine a time interval Δt=t2−t1, and the second node may determine a sending time point of each PDCP PDU based on Δt and t1 or t2. Herein, t1 and t2 may be carried in same or different information, fields, signaling, or messages for sending. For example, t1 is carried in a data packet header of the PDCP PDU 1, and t2 is carried in a data packet header of the PDCP PDU 2. This is not specifically limited in this application.

Alternatively, as shown in FIG. 10, when the second node sends a plurality of synchronization sequences belonging to a same synchronization sequence group, the first target sending time information may indicate that t1 is a sending time point of a synchronization sequence to which a PDCP PDU 1 and a PDCP PDU 2 belong, and indicate a sending interval Δt between adjacent synchronization sequences. The second node may determine, based on t1 and Δt, a sending time point at which each synchronization sequence is to be sent. In addition, the first node may further indicate the sending time point of each synchronization sequence. Herein, t1 and Δt may be carried in same information, a same field, same signaling, or a same message for sending. For example, both t1 and Δt are carried in a data packet header of the PDCP PDU 1. Alternatively, t1 and Δt may be separately sent, for example, carried in different information, fields, signaling, or messages for sending. This is not specifically limited in this application.

Alternatively, when the second node sends a plurality of synchronization sequences belonging to a same synchronization sequence group, the first target sending time information may indicate that t1 is a sending time point of a synchronization sequence to which a PDCP PDU 1 and a PDCP PDU 2 belong, and indicate that t2 is a sending time point of a synchronization sequence to which a PDCP PDU 3 and a PDCP PDU 4 belong. In this case, the second node may determine Δt=t2−t1, Δt is a sending interval between two adjacent synchronization sequences in the synchronization sequence group, and subsequently, the second node may determine, based on t1 and Δt, a sending time point at which each synchronization sequence in the synchronization sequence group is to be sent. In addition, the first node may directly indicate the sending time point of each synchronization sequence. Herein, t1 and t2 may be carried in same or different information, fields, signaling, or messages for sending. For example, t1 is carried in a data packet header of the PDCP PDU 1, and t2 is carried in a data packet header of the PDCP PDU 2. This is not specifically limited in this application.

(3) A form of the first target sending time information is described.

In an implementation, the first target sending time information may indicate a timestamp, that is, indicate a time point at which the second node starts to send the first PDCP PDU. The timestamp herein may be an absolute time, for example, 8:30; or may be a relative time period, for example, a relative time period 1:00 relative to a scheduling cycle.

In another implementation, for a plurality of first PDCP PDUs that are to be cyclically sent, the first target sending time information may further indicate a time period, and the time period is a time period in which the second node is to send the first PDCP PDUs. The time period may be a default relative time period relative to a default synchronization cycle, for example, a default cycle of 0:10. The first target sending time information may further indicate a time point at which the first PDCP PDU starts to be sent, for example, a sending time point of a $1^{st}$ data packet. In this case, the second node may determine a sending time point of each first PDCP PDU based on the time point at which sending is started and the time period. Alternatively, the time period may be a relative time period relative to a default synchronization cycle, for example, a default cycle of 0:10. The time information may indicate that a sending time period of the first PDCP PDU is the default cycle plus 0:02 or minus 0:03. The time period may alternatively be a relative time period relative to a previous synchronization cycle.

In addition, a plurality of patterns (pattern) may be set on the first node and the second node by using a protocol, through pre-negotiation, or through pre-configuration, and sending intervals between PDCP PDUs in different patterns are different. In this case, the first target sending time information may further indicate a pattern. In addition, the first target sending time information may further indicate a start time point at which the first PDCP PDU starts to be sent based on the pattern, for example, the sending time point of the $1^{st}$ data packet. For example, the first target sending time information may include a pattern number, and the second node may determine a used pattern based on the pattern number, to determine a sending time point of the first PDCP PDU.

(4) A carrying manner of the first target sending time information is described.

In a possible implementation, the first target sending time information may be carried in a packet header of a PDCP PDU, or the first target sending time information may be carried in the first PDCP PDU. For example, the first PDCP PDU may be sent from the first node to the second node by using a user plane data packet header type (type) 0 frame format of an F1 interface, and the type 0 frame format may carry the first target sending time information.

If the second node needs to send a plurality of PDCP PDUs, the first node may use each PDCP PDU to be sent to the second node, to carry first target time sending time information of each PDCP PDU. If the first PDCP PDU includes a plurality of PDCP PDUs belonging to a same synchronization sequence, the first target sending time information may be carried in a $1^{st}$ data packet in the synchronization sequence.

In another possible implementation, the first target sending time information may be carried in control signaling sent by the first node to the second node.

If the first node sends the first PDCP PDU to the second node, the first target sending time information may be carried in the first PDCP PDU. If the second node obtains the first PDCP PDU from another node (which may be referred to as a fourth node) different from the first node, the first target sending time information may be carried in the control signaling sent by the first node to the second node.

The foregoing headings (1) to (4) separately describe the sending manner of the first target sending time information from different aspects. Sending methods of the first target sending time information in different headings may be mutually combined.

In a possible example, the first node further sends the first PDCP PDU to the second node. To be specific, as shown in FIG. 6, a data packet may reach the first node through a core network, and then the first node sends the data packet to a plurality of second nodes.

In a possible example, a fourth node sends the first PDCP PDU to the second node. The fourth node is different from the first node. The fourth node may be a core network device or another access network device. This is not limited in this embodiment of this application. In this case, it may be understood that the first node sends the first target sending time information to the second node, and the fourth node sends, to the second node, the first PDCP PDU associated with the first target sending time information. It may be understood that similar processing may also be performed in step S103. Details are not described again. To be specific, as shown in FIG. 7, a data packet may reach the second node through the fourth node in the core network, and the data packet is no longer sent by the first node to the second node.

Correspondingly, the second node receives the first target sending time information.

In S101, a sending action of the first node may be implemented by a transceiver module 420 and/or a transceiver unit 510, and a receiving action of the second node may be implemented by the transceiver module 420 and/or the transceiver unit 510.

S102: The second node sends first sending status information, where the first sending status information is associated with the first PDCP PDU.

The first sending status information may indicate a sending completion time point of the first PDCP PDU. For example, the first sending status information may include a processing completion time point of the first PDCP PDU (that is, data of the MAC PDU corresponding to the first PDCP PDU is generated), or include sending completion absolute time information or relative time information of the MAC PDU corresponding to the first PDCP PDU, or include information used to determine whether sending is completed. The information may be used by the first node to determine whether to increase or reduce a sending interval between PDCP PDUs. Alternatively, the first sending status information may indicate to increase the sending interval between PDCP PDUs, or the first sending status information may indicate to reduce the sending interval between PDCP PDUs.

Optionally, the second node may generate the MAC PDU based on the first PDCP PDU. Specifically, the second node may generate the at least one MAC PDU after segmenting and/or concatenating a plurality of PDCP PDUs including the first PDCP PDU. In this case, the first sending status information may specifically include a correspondence between the first PDCP PDU and a MAC PDU (or a resource block corresponding to the MAC PDU). In this application, that a PDCP PDU corresponds to a MAC PDU means that the MAC PDU carries some or all data obtained after a splitting and/or concatenation operation is performed on the PDCP PDU. The first sending status information may further include segmentation information or concatenation information of the first PDCP PDU, information indicating whether sending of the first PDCP PDU is completed, or resource utilization information.

FIG. 3 is still used as an example for description herein. As shown in FIG. 3, based on the received PDCP 1, PDCP 2, and PDCP 3, the second node may generate a MAC PDU 1, a MAC PDU 2, and a MAC PDU 3 by performing splitting and concatenation operations. Splitting means that an RLC layer splits one PDCP PDU into a plurality of RLC PDUs. Concatenation means that a MAC layer combines a plurality of RLC PDUs into one MAC PDU.

In a possible implementation, the first sending status information may indicate a correspondence between one or more of the PDCP 1, the PDCP 2, and the PDCP 3 and one or more of the MAC PDU 1, the MAC PDU 2, and the MAC PDU 3, to indicate the sending completion time point of the first PDCP PDU. For example, if the first PDCP PDU is the PDCP PDU 1, the first sending status information indicates a correspondence between the PDCP PDU 1 and the MAC PDU 1. For another example, if the first PDCP PDU is the PDCP PDU 2, the first sending status information may indicate a correspondence between the PDCP PDU 2 and each of the MAC PDU 1 and the MAC PDU 2. Alternatively, the first sending status information may indicate that the first x bytes of the PDCP PDU 2 correspond to x1 to x2 bytes of the MAC PDU 1, and the last y bytes of the PDCP PDU 2 correspond to y1 to y2 bytes of the MAC PDU 2. Alternatively, the first sending status information may indicate a system frame number (system frame number, SFN), a slot number, and/or a symbol number occupied for actually sending the first x bytes of the PDCP PDU 2, and the first sending status information may indicate a system frame number, a slot number, and/or a symbol number occupied for actually sending the last y bytes of the PDCP PDU 2. Alternatively, the first sending status information may indicate a correspondence between a MAC PDU (or a resource block corresponding to the MAC PDU) and at least one PDCP PDU, for example, indicate that the MAC PDU 2 corresponds to the PDCP PDU 2 and the PDCP PDU 3.

In another implementation, the first sending status information may indicate splitting information and/or concatenation information between the PDCP 1, the PDCP 2, and the PDCP 3, to indicate the sending completion time point of the first PDCP PDU. For example, if the first PDCP PDU is the PDCP PDU 1, the first sending status information may indicate that the PDCP PDU 1 is concatenated with the first x bytes of the PDCP PDU 2. If the first PDCP PDU is the PDCP PDU 2, the first sending status information may indicate that the PDCP PDU 2 is split into the first x bytes and the last y bytes, indicate that the first x bytes of the PDCP PDU 2 are concatenated with the PDCP PDU 1, and indicate that the last y bytes of the PDCP PDU 2 are concatenated with the first z bytes of the PDCP PDU 3.

Therefore, the first node may learn of the sending completion time point of the first PDCP PDU based on the correspondence between the first PDCP PDU and a MAC PDU and the splitting information and/or the concatenation information of the first PDCP PDU, to determine whether all data of the first PDCP PDU is carried in a same MAC PDU, and determine, based on this, whether the sending interval between PDCP PDUs needs to be increased or reduced.

In an example, if splitting and concatenation operations are frequently performed on the PDCP PDUs, for example, concatenation is continuously performed on a specific quantity of PDCP PDUs or a specific proportion of PDCP PDUs, it is considered that the sending interval between PDCP PDUs needs to be increased. The quantity or the proportion may be a fixed value, or this threshold may be generated by a master control node based on other information, a service type, a quality of service (QoS) requirement, or the like carried in a sending status, and may be a static or dynamic threshold. A specific implementation is not limited.

In another example, the first node determines, based on received sending status information, that for a specific quantity of received consecutive PDCP PDUs or PDCP PDUs whose proportion exceeds a specific proportion, only a segmentation operation is performed, but no concatenation operation is performed. Each PDCP PDU is split into at least N segments, where N is greater than or equal to 3. In this case, it is considered that the sending interval between PDCP PDUs may be reduced. The quantity or the proportion may be a fixed value, or this threshold may be generated by the first node based on other information, a service type, a quality of service requirement, or the like carried in a sending status, and may be a static threshold or a dynamic threshold. A specific implementation is not limited.

In still another example, the first sending status information may further indicate whether sending of the first PDCP PDU is completed. As shown in FIG. 3, for example, the first PDCP PDU is the PDCP PDU 1. After receiving the PDCP PDU 2, the second node needs to perform splitting and concatenation operations, to obtain a MAC PDCP PDU 1. The second node may not complete sending of the MAC PDU 1 before t2. If the second node stops sending the MAC PDU 1 after t2, the second node actually does not complete sending of data included in the PDCP PDU 1, and user equipment can receive only a part of data included in the PDCP PDU 1. In this case, the second node needs to indicate, based on the first sending status information, that sending of the PDCP PDU 1 is not completed. If sending of the first PDCP PDU is not completed, it indicates that the first node needs to increase the sending interval between PDCP PDUs. Alternatively, when the first node learns, based on the sending status information, that sending of a specific proportion of PDCP PDUs or a specific quantity of consecutive PDCP PDUs is not completed, it indicates that the first node needs to increase the sending interval between PDCP PDUs.

In addition, the first sending status information may further indicate resource utilization information. The resource utilization information may be an SFN, a slot, a symbol, or a combination of a plurality of consecutive symbols in which the first PDCP PDU is located, or time-frequency resource utilization in a specific period of time before the first sending status information is sent. As shown in FIG. 3, because sending of the MAC PDU 1 is stopped at the moment t2, and sending of the MAC PDU 2 cannot be started at the moment t2, resource utilization is low after the moment t2. If the resource usage is lower than a threshold, the sending interval between PDCP PDUs needs to be increased. For example, the time utilization may be actual time utilization in a time period between two adjacent target sending time points, time utilization in a time period in which a sending status is reported for two consecutive times, or time utilization in an absolute time period.

In addition, the second node may indicate, based on the first sending status information, to increase or reduce the sending interval between PDCP PDUs. Based on one or more of the correspondence between the first PDCP PDU and a MAC PDU, the splitting information and/or the concatenation information of the first PDCP PDU, the information indicating whether sending of the first PDCP PDU is completed, or the resource utilization information, the second node may determine that the sending interval between PDCP PDUs needs to be increased or reduced, or determine a proper sending interval. For a principle, refer to the description of determining, by the first node, that the sending interval between PDCP PDUs needs to be increased or reduced. Details are not described herein again. Therefore, the second node may put forward, to the first node based on the first sending status information, a recommendation for adjusting the sending interval between PDCP PDUs, and the first node determines whether to increase or reduce the sending interval between PDCP PDUs, and determines an amplitude of increasing or reducing the sending interval.

The first sending status information may further indicate the sending interval between PDCP PDUs that is expected by the second node, so that the first node determines a sending time point of the second PDCP PDU based on the sending interval. For example, after determining the proper sending interval, the second node may indicate a pattern number corresponding to the sending interval to the first node, and the first node sets the sending interval between PDCP PDUs based on a pattern. For example, the first node may use a pattern recommended by the second node, or set another pattern based on a recommendation of the second node.

Optionally, the first sending status information may be carried in a frame format of a downlink data delivery status or assistance information data. Correspondingly, the frame format may carry 1 bit to indicate that the data packet header carries the first sending status information. Specifically, a PDCP PDU associated with the first sending status information may be indicated, and first sending status information of a plurality of PDCP PDUs may be combined and sent in one data packet header frame format. For example, a data packet header is associated with the PDCP PDU 1, the PDCP PDU 2, and the PDCP PDU 3. A highest packet number field that is successfully sent may be set to the PDCP PDU 2, to indicate that both the PDCP PDU 1 and the PDCP PDU 2 are successfully sent at the target sending time point, to reduce a sending frequency of the first sending status information. A specific implementation is not limited herein.

Correspondingly, the first node may receive the first sending status information.

In S102, a sending action of the second node may be implemented by the transceiver module 420 and/or the transceiver unit 510, and a receiving action of the first node may be implemented by the transceiver module 420 and/or the transceiver unit 510.

It should be understood that the first sending status information associated with the first PDCP PDU is described in S101 and S102. In an actual application, the first node may also receive sending status information associated with another PDCP PDU from the second node or another slave node. For an implementation of sending status information associated with another PDCP PDU, refer to the first sending status information. Therefore, the first node may determine, based on sending status information (which may include but is not limited to the first sending status information) associated with the plurality of PDCP PDUs, whether the sending interval between PDCP PDUs needs to be increased or reduced, to adjust the sending interval between PDCP PDUs more accurately.

S103: The first node sends second target sending time information to the second node based on the first sending status information, where the second target sending time information indicates the sending time point of the second PDCP PDU.

The sending time point of the second PDCP PDU may be determined based on the sending interval between PDCP PDUs and a sending time point of a previous PDCP PDU of the second PDCP PDU.

For a sending manner of the second PDCP PDU, refer to a sending manner of the first PDCP PDU.

For example, in an implementation, if the first node determines, based on the first sending status information, that the sending interval between PDCP PDUs needs to be increased, a sending interval between the sending time point of the second PDCP PDU and the sending time point of the previous PDCP PDU of the second PDCP PDU may be set to a larger value. For example, if a previously sent first PDCP PDU includes a plurality of PDCP PDUs belonging to a same synchronization sequence, and a sending interval between two adjacent PDCP PDUs in the synchronization sequence is T1, or a sending interval between the first PDCP PDU and a previous PDCP PDU that is of the first PDCP PDU and that needs to be synchronously sent by a plurality of nodes is T1, the larger value may be greater than T1. On the contrary, if the first node determines, based on the first sending status information, that the sending interval between PDCP PDUs needs to be reduced, the sending interval between the sending time point of the second PDCP PDU and the sending time point of the previous PDCP PDU of the second PDCP PDU may be set to a smaller value, and the smaller value may be less than T1.

In another implementation, if the second PDCP PDU includes a plurality of PDCP PDUs belonging to a same synchronization sequence, the second target sending time information may indicate a time point at which the second node sends a $1^{st}$ data packet (for example, a PDCP PDU) in the second PDCP PDU. If the first node determines, based on the first sending status information, that the sending interval between PDCP PDUs needs to be increased, a time interval between the sending time point of the second PDCP PDU and the sending time point of the previous PDCP PDU may be set to a larger value. On the contrary, if the first node determines, based on the first sending status information, that the sending interval between PDCP PDUs needs to be reduced, the time interval between the sending time point of the second PDCP PDU and the sending time point of the previous PDCP PDU may be set to a smaller value.

Correspondingly, the second node receives the second target sending time information.

In S103, the sending action of the first node may be implemented by the transceiver module 420 and/or the transceiver unit 510, and the receiving action of the second node may be implemented by the transceiver module 420 and/or the transceiver unit 510.

According to the method shown in FIG. 8, the first node may determine the sending time point of the second PDCP PDU based on the first sending status information from the second node, where the first sending status information is associated with the first PDCP PDU, so that the first node can adjust the sending time point of the second PDCP PDU based on a sending situation of the first PDCP PDU, to reduce a packet loss caused when the MAC PDU 1 and the MAC PDU 2 shown in FIG. 3 are not completely sent in a timely manner, so as to improve reliability of a synchronous data transmission mechanism, and improve resource utilization.

Optionally, before S102, the first node may further send at least one of first indication information, second indication information, an identifier of the second node, information used to request the first sending status information, sending condition information of the first sending status information, third indication information, or fourth indication information to the second node. Correspondingly, the second node may receive information sent by the first node. The sending action of the first node herein may be implemented by the transceiver module 420 and/or the transceiver unit 510, and the receiving action of the second node may be implemented by the transceiver module 420 and/or the transceiver unit 510.

For example, the first node may further use a frame format of a data packet of the first PDCP PDU, for example, a type 0 or a PDU type specially used for synchronization, to carry at least one of the first indication information, the second indication information, the identifier of the second node, the information used to request the first sending status information, the sending condition information of the first sending status information, the third indication information, or the fourth indication information for sending to the second node, and 1 bit in a PDU type 0 may indicate that the PDCP PDU needs to send related sending status information, or carry the identifier of the related second node.

The following describes the foregoing information in detail:

The first indication information may indicate that the first PDCP PDU needs to be synchronously sent by a plurality of nodes. This application is mainly applied to a synchronous sending scenario. Therefore, the second node may perform S102 if the first PDCP PDU is a data packet that needs to be synchronously sent by a plurality of nodes; or S102 and a subsequent operation do not need to be performed if the first PDCP PDU is not a data packet that needs to be synchronously sent by a plurality of nodes. The second node may identify, based on the first indication information from the first node, that the first PDCP PDU needs to be synchronously sent by a plurality of nodes. In addition, the first node and/or the second node may identify, based on information about a service to which the first PDCP PDU belongs, that the first PDCP PDU needs to be synchronously sent by a plurality of nodes.

The second indication information may indicate that the second PDCP PDU needs to be synchronously sent by a plurality of nodes. If the second PDCP PDU does not need to be synchronously sent by a plurality of nodes, the sending time point of the second PDCP PDU does not need to be determined in the method shown in FIG. 8. The second node may determine, based on the second indication information, that the second PDCP PDU needs to be synchronously sent by a plurality of nodes. The first node and/or the second node may identify, based on information about a service to which the second PDCP PDU belongs, that the second PDCP PDU needs to be synchronously sent by a plurality of nodes.

It may be understood that the first indication information and the second indication information may be same indication information. For example, the first indication information indicates that both the first PDCP PDU and a subsequent PDCP PDU each need to be synchronously sent by a plurality of nodes. A frequency of indication information may be further reduced, to reduce signaling overheads.

The identifier of the second node may be used by the second node to determine that the first sending status information needs to be sent to the first node. In the synchronous sending scenario, a plurality of slave nodes may receive the first target sending time information. The first node may indicate, from the plurality of slave nodes based on the identifier of the second node, a second node that needs to send the first sending status information, and the other slave nodes do not need to feed back the first sending status information, to reduce signaling overheads. In addition, it may also be considered by default that all the slave nodes need to send the first sending status information.

The information used to request the first sending status information may be used to trigger sending of the first sending status information. For example, when the second node receives the information used to request the first sending status information, the second node may send the first sending status information; or if the second node does not receive the information used to request the first sending status information, the second node does not need to send the first sending status information.

The sending condition information of the first sending status information may indicate a sending condition of the first sending status information. The sending condition is, for example, a cycle condition or an event condition. If the sending condition is a cycle condition, the condition information may be used to determine a cycle in which the first sending status information is sent and a time point at which the first sending status information is sent for a first time. For example, after receiving the condition information, the second node sends 1$^{st}$ first sending status information, and then cyclically sends the first sending status information based on a cycle. Optionally, in this application, specific duration may be used as one cycle, or duration in which sending of n1 MAC PDUs is completed may be used as one cycle, or duration in which processing of n2 PDCP PDUs is completed may be used as a cycle. If the sending condition is an event condition, the condition information may indicate that the first sending status information is sent when a specific event occurs. For example, the specific event is that the second node determines to perform a splitting or concatenation operation on a PDCP PDU, or the second node detects that a packet loss occurs, or the second node determines that sending of a PDCP PDU is not completed.

The third indication information may indicate whether the first PDCP PDU includes a plurality of PDCP PDUs belonging to a same synchronization sequence. Whether the first PDCP PDU includes a plurality of PDCP PDUs may be determined based on the indication information. If there is only one PDCP PDU, a corresponding remaining time resource may be fed back to the first node to assist the first node in another service or scheduling of a packet that needs to be retransmitted, to use resources more efficiently.

Similar to the third indication information, the fourth indication information may indicate whether the second PDCP PDU includes a plurality of PDCP PDUs belonging to a same synchronization sequence. Whether the second PDCP PDU includes a plurality of PDCP PDUs may be determined based on the indication information. If there is only one PDCP PDU, a corresponding remaining time resource may be fed back to the first node to assist the first node in another service or scheduling of a packet that needs to be retransmitted, to use resources more efficiently.

It should be understood that, in addition to content of the foregoing example, in this application, the first node may further send necessary information to the second node, to support the second node in implementing the action shown in S102. The necessary information may also be carried in the data packet header of the first PDCP PDU, for example, carried in a data packet header whose frame format is a PDCP type 0 format or a data packet header specially used for synchronization. The necessary information is, for example, type indication information of the first sending status information, and is used to indicate that the first sending status information is one of the plurality of the foregoing example types.

Optionally, when a new slave node (referred to as a third node below) joins synchronous transmission that is being performed currently, a manner in which the third node joins synchronous transmission may be determined based on different PDCP PDU services that are being transmitted. The sending and receiving actions of the first node herein may be implemented by the transceiver module 420 and/or the transceiver unit 510, the sending and receiving actions of the second node may be implemented by the transceiver module 420 and/or the transceiver unit 510, and the sending and receiving actions of the third node may be implemented by the transceiver module 420 and/or the transceiver unit 510.

The following describes several synchronous transmission joining manners by using examples.

Manner 1: An emergency joining manner: The first node sends a PDCP PDU to the third node and indicates a sending time point of the PDCP PDU starting from a 1$^{st}$ data packet (the data packet herein is a PDCP PDU) whose sending time point is after a synchronous transmission joining request from the third node is received and a PDCP PDU that is before the PDCP PDU and that corresponds to a same MAC PDU as the PDCP PDU. A time point at which the second node sends the PDCP PDU is consistent with a time point at which the third node sends the PDCP PDU, so that the third node joins synchronous transmission as quickly as possible.

Specifically, after the first node receives a first request from the third node, the first node sends third target sending time information, a third PDCP PDU, and a fourth PDCP PDU to the third node. The third target sending time information indicates a sending time point of the third PDCP PDU, the third PDCP PDU is a 1$^{st}$ data packet whose sending time point is after a first moment, the first moment is a moment at which the first node receives the first request, and an end part bit of the fourth PDCP PDU and the third PDCP PDU correspond to a same MAC PDU, so that the third node sends data of a first service starting from the fourth PDCP PDU and the third PDCP PDU. The first moment herein is a moment at which the first node receives the first request. The first request is used to request the data of the first service, and the data of the first service is synchronously sent to the UE by at least the second node and the third node. The first node may determine, based on second sending status information from the second node, that the third PDCP PDU is a 1$^{st}$ data packet after the first moment, the fourth PDCP PDU is a PDCP PDU before the third PDCP PDU, and the end part bit of the fourth PDCP PDU and the third PDCP PDU correspond to a same MAC PDU. The second sending status information may be associated with the third PDCP PDU. For example, the second sending status information includes concatenation information of the third PDCP PDU, indicating that the third PDCP PDU is concatenated with the fourth PDCP PDU, or indicating that the third PDCP PDU and the fourth PDCP PDU correspond to a same MAC PDU. It may be understood that the fourth PDCP PDU may include one or more PDCP PDUs. For a determining manner and a sending manner of the second sending status information, refer to the first sending status information. Details are not described herein again.

Figure 11:
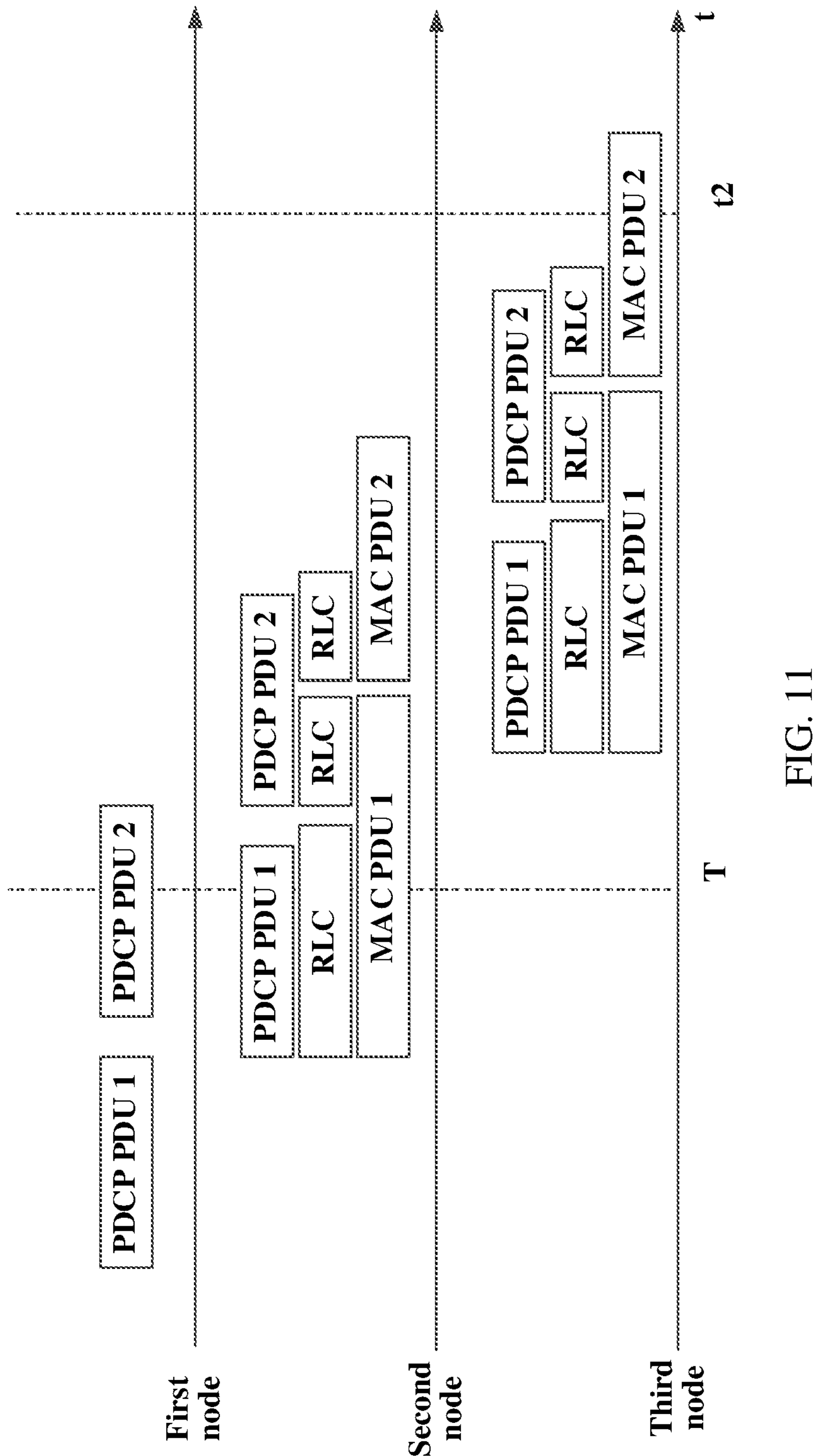
FIG. 11 is a schematic diagram of a time domain of another synchronous data sending process according to an embodiment of this application.

FIG. 11 is used as an example. The first node may send the PDCP PDU 1 and the PDCP PDU 2 to the second node, and receive the second sending status information from the second node. The second sending status information may indicate that the PDCP PDU 1 and the PDCP PDU 2 correspond to the MAC PDU 2, or indicate splitting and concatenation information of the PDCP PDU 1 and the PDCP PDU 2. The splitting and concatenation information may indicate that some or all bytes of the PDCP PDU 1 are concatenated with some or all bytes of the PDCP PDU 2. For the second node, the PDCP PDU 1 and the PDCP PDU 2 may be assembled into the MAC PDU 1 and the MAC PDU 2. If the first node receives the first request from the third node at a moment T, where T is the first moment, t1<T<t2, and t1 and t2 are respectively sending time points of the PDCP PDU 1 and the PDCP PDU 2, the first node may learn, based on the second sending status information, that the PDCP PDU 2 is a 1$^{st}$ data packet sent by the first node after the moment T, and both an end part bit of the PDCP PDU 1 and a start part bit of the PDCP PDU 2 correspond to the MAC PDU 1. Therefore, the first node may send the PDCP PDU 1 and the PDCP PDU 2 to the third node, and use a packet header of the PDCP PDU 2 to carry indication information of the sending time point t2. The indication information is the third target sending time information.

It should be understood that, in FIG. 11, the PDCP PDU 1 sent by the first node to the second node and the PDCP PDU 1 sent by the first node to the third node respectively indicate two PDCP PDUs with same content, and the two PDCP PDUs may not be completely the same. For example, the two PDCP PDUs have same content, but feedback conditions of the two PDCP PDUs are different, for example, are whether the node needs to send the sending status information. Similarly, the PDCP PDU 2 sent by the first node to the second node and the PDCP PDU 2 sent by the first node to the third node respectively indicate two PDCP PDUs with same content, and the two PDCP PDUs may not be completely the same. Similarly, in FIG. 11, the MAC PDU 1 and the MAC PDU 2 on side of the second node may respectively carry same content as the MAC PDU 1 and the MAC PDU 2 on the side of the third node.

In this manner, the first node may send a plurality of PDCP PDUs including the PDCP PDU 1 and the PDCP PDU 2 to the second node. The PDCP PDU 2 is a previous PDCP PDU of the PDCP PDU 1. In other words, the PDCP PDU 2 is a 1$^{st}$ data packet whose sending time point t1 is before the sending time point t2 of the PDCP PDU 1. The PDCP PDU 1 may carry information indicating t2. Alternatively, in addition to sending the third PDCP PDU, the first node additionally sends the information indicating t2. Then, the second node performs operations such as splitting and/or concatenation, to obtain at least one MAC PDU including the MAC PDU 1, and sends the second sending status information to the first node, to indicate that the MAC PDU 1 corresponds to the PDCP PDU 1 and the PDCP PDU 2. In addition, the first node may receive the first request from the third node before or after sending the PDCP PDU 1 and the PDCP PDU 2 to the second node and before or after receiving the second sending status information, provided that a moment at which the first request is received is between t1 and t2. After determining the third PDCP PDU based on the second sending status information, the first node may send the PDCP PDU 1, the PDCP PDU 2, and the third target sending time information to the third node.

Optionally, the first node sends fourth target sending time information to the second node, to indicate a sending time point of the third PDCP PDU on the second node. If the third node cannot complete processing of the third PDCP PDU before the sending time point that is of the third PDCP PDU and that is indicated by the fourth target sending time information, the first node may set, to a time point (the time point is referred to as an updated sending time point of the third PDCP PDU below) abundant for the third node to process the third PDCP PDU, the sending time point that is of the third PDCP PDU and that is indicated by the third target sending time information, notify the third node of the sending time point of the third PDCP PDU by using the third target sending time information, and notify the second node of the sending time point of the third PDCP PDU by using the third target sending time information (that is, the updated sending time point of the third PDCP PDU), so that the second node sends the third PDCP PDU at the sending time point indicated by the third target sending time information, instead of sending the third PDCP PDU at the sending time point indicated by the fourth target sending time information.

For example, that processing of the third PDCP PDU is not completed in a timely manner is, for example, that a time interval between a moment at which the first node receives the first request and a sending time point that is of the third PDCP PDU and that is indicated by the first node to the second node by using the fourth target sending time information is insufficient for the third node to segment, concatenate, and/or assemble the third PDCP PDU, to obtain a MAC PDU corresponding to the third PDCP PDU.

For example, before receiving the first request, the first node may indicate the sending time point of the third PDCP PDU to the second node by using the fourth target sending time information. After receiving the first request from the third node, the first node separately sends the third target sending time information to the second node and the third node. The sending time point that is of the third PDCP PDU and that is indicated by the third target sending time information is different from the sending time point indicated by the fourth target sending time information. For example, a time point indicated by the third target sending time information is later than a time point indicated by the fourth target sending time information.

Optionally, the third target sending time information may be carried in the data packet header of the third PDCP PDU.

Manner 2: In a non-emergency joining manner, after receiving a joining request from the third node, the first node sends a PDCP PDU to the third node and indicates a sending time point of the PDCP PDU starting from a 1$^{st}$ data packet aligned with a start location of the PDCP PDU and a start location of a MAC PDU. A time point at which the second node sends the PDCP PDU is consistent with a time point at which the third node sends the PDCP PDU. In this process, the third node may wait for a period of time before starting sending of data.

Specifically, after the first node receives a second request from the third node, the first node sends fifth target sending time information and a fifth PDCP PDU to the third node. The third node sends the target sending time information to indicate a sending time point of the fifth PDCP PDU, the fifth PDCP PDU is a 1$^{st}$ PDCP PDU whose sending time point is after a second moment and whose sending time point is at a start location of a MAC PDU of the second node, and the second moment is a moment at which the first node receives the second request, so that the third node sends data of a second service starting from the fifth PDCP PDU. In other words, the fifth PDCP PDU and a PDCP PDU (or an end part bit of the PDCP PDU) before the fifth PDCP PDU do not correspond to a same MAC PDU of the second node. The second request is used to request the data of the second service, and the data of the second service is synchronously sent to the UE by at least the second node and the third node. The first node may determine the fifth PDCP PDU based on the first sending status information sent by the second node.

Optionally, the fifth target sending time information may be carried in a data packet header of the fifth PDCP PDU. It should be understood that the sending time point herein is a time point at which the second node starts to send the PDCP PDU.

The first node may determine, based on the third sending status information from the second node, that the fifth PDCP PDU is the 1$^{st}$ PDCP PDU whose sending time point is after the second moment and whose sending time point is at the start location of the MAC PDU of the second node. For a determining manner and a sending manner of the third sending status information, refer to the first sending status information. Details are not described herein again. For example, the third sending status information may indicate that the MAC PDU corresponds to the fifth PDCP PDU or corresponds to the fifth PDCP PDU and a PDCP PDU after the fifth PDCP PDU, and/or the third sending status information may indicate that the MAC PDU does not correspond to any PDCP PDU before the fifth PDCP PDU.

Figure 12:
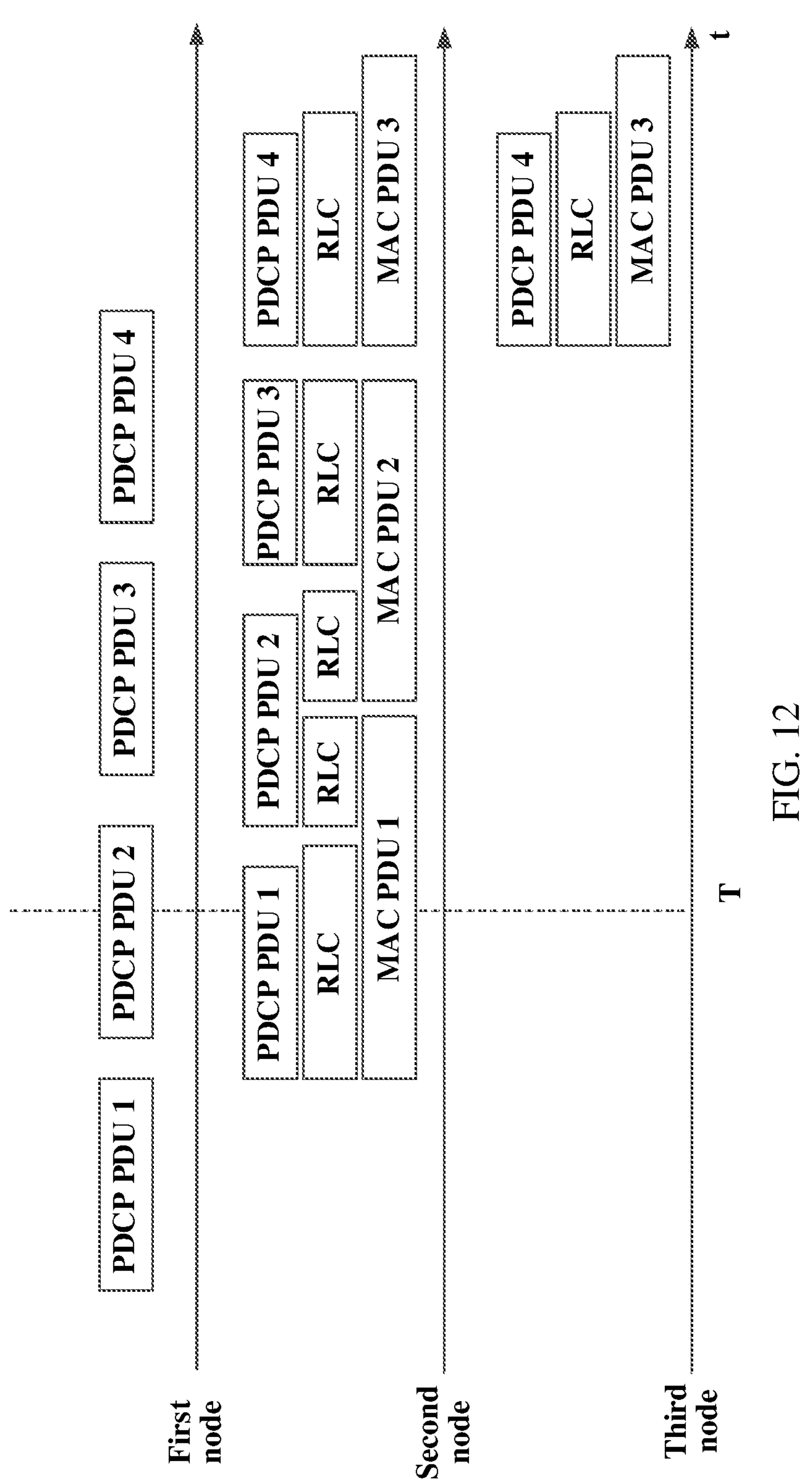
FIG. 12 is a schematic diagram of a time domain of another synchronous data sending process according to an embodiment of this application.

FIG. 12 is used as an example. The first node may send the PDCP PDU 1, the PDCP PDU 2, the PDCP PDU 3, and the PDCP PDU 4 to the second node, and receive the third sending status information from the second node. The third sending status information may indicate that a sending time point of the PDCP PDU 4 is at a start location of a MAC PDU, or indicate that the PDCP PDU 4 and the PDCP PDU 3 are not concatenated in a same MAC PDU. For the second node, the PDCP PDU 1, the PDCP PDU 2, the PDCP PDU 3, and the PDCP PDU 4 may be assembled into the MAC PDU 1, the MAC PDU 2, and the MAC PDU 3. The first node may learn, based on the third sending status information, of a correspondence between each of the PDCP PDU 1, the PDCP PDU 2, the PDCP PDU 3, and the PDCP PDU 4 shown in FIG. 12 and each of the MAC PDU 1, the MAC PDU 2, and the MAC PDU 3. The MAC PDU 3 corresponds to the PDCP PDU 4, and the MAC PDU 3 does not correspond to any PDCP PDU before the PDCP PDU 4. If the first node receives the first request from the third node at the moment T, where T is the second moment, t1<T<t4, for example, t1<T<t2, and t1 and t2 are respectively sending time points of the PDCP PDU 1 and the PDCP PDU 2, the PDCP PDU 4 is a 1$^{st}$ PDCP PDU whose sending time point is after the moment T and whose sending time point is at the start location of the MAC PDU. Therefore, the first node may determine that the fifth PDCP PDU is the PDCP PDU 4. Then, the first node may send the PDCP PDU 4 to the third node, and use a packet header of the PDCP PDU 4 to carry indication information of the sending time point t4. The indication information is the fifth target sending time information.

It should be understood that, in FIG. 12, the PDCP PDU 4 sent by the first node to the second node and the PDCP PDU 4 sent by the first node to the third node indicate two PDCP PDUs with same content, and the two PDCP PDUs may not be completely the same. Similarly, in FIG. 12, a MAC PDU 3 on the side of the second node may carry same content as a MAC PDU 3 on the side of the third node.

In this manner, the first node may send, to the second node, a plurality of PDCP PDUs including the PDCP PDU 1, the PDCP PDU 2, the PDCP PDU 3, and the PDCP PDU 4. The plurality of PDCP PDUs may respectively carry information indicating respective sending time points of the PDCP PDUs. Alternatively, in addition to sending the plurality of PDCP PDUs, the first node additionally sends information indicating respective sending time points of the plurality of PDCP PDUs. Then, the second node performs operations such as splitting and/or concatenation, to obtain a plurality of MAC PDUs including the MAC PDU 1, the MAC PDU 2, and the MAC PDU 3, and sends the third sending status information to the first node, to indicate that the MAC PDU 4 corresponds to the PDCP PDU 4 and does not correspond to any PDCP PDU before the PDCP PDU 3. In addition, the first node may receive the second request from the third node before or after sending any one of the PDCP PDU 1, the PDCP PDU 2, the PDCP PDU 3, and the PDCP PDU 4, and before or after receiving the third sending status information, provided that the moment T at which the first request is received is between t1 and t4. After determining the fifth PDCP PDU based on the third sending status information, the first node may send the fifth PDCP PDU and the fifth target sending time information to the third node.

Optionally, in the non-emergency joining manner, the PDCP PDU may include a plurality of PDCP PDUs belonging to a same synchronization sequence. In this case, the fifth PDCP PDU includes all PDCP PDUs in one synchronization sequence.

Figure 13:
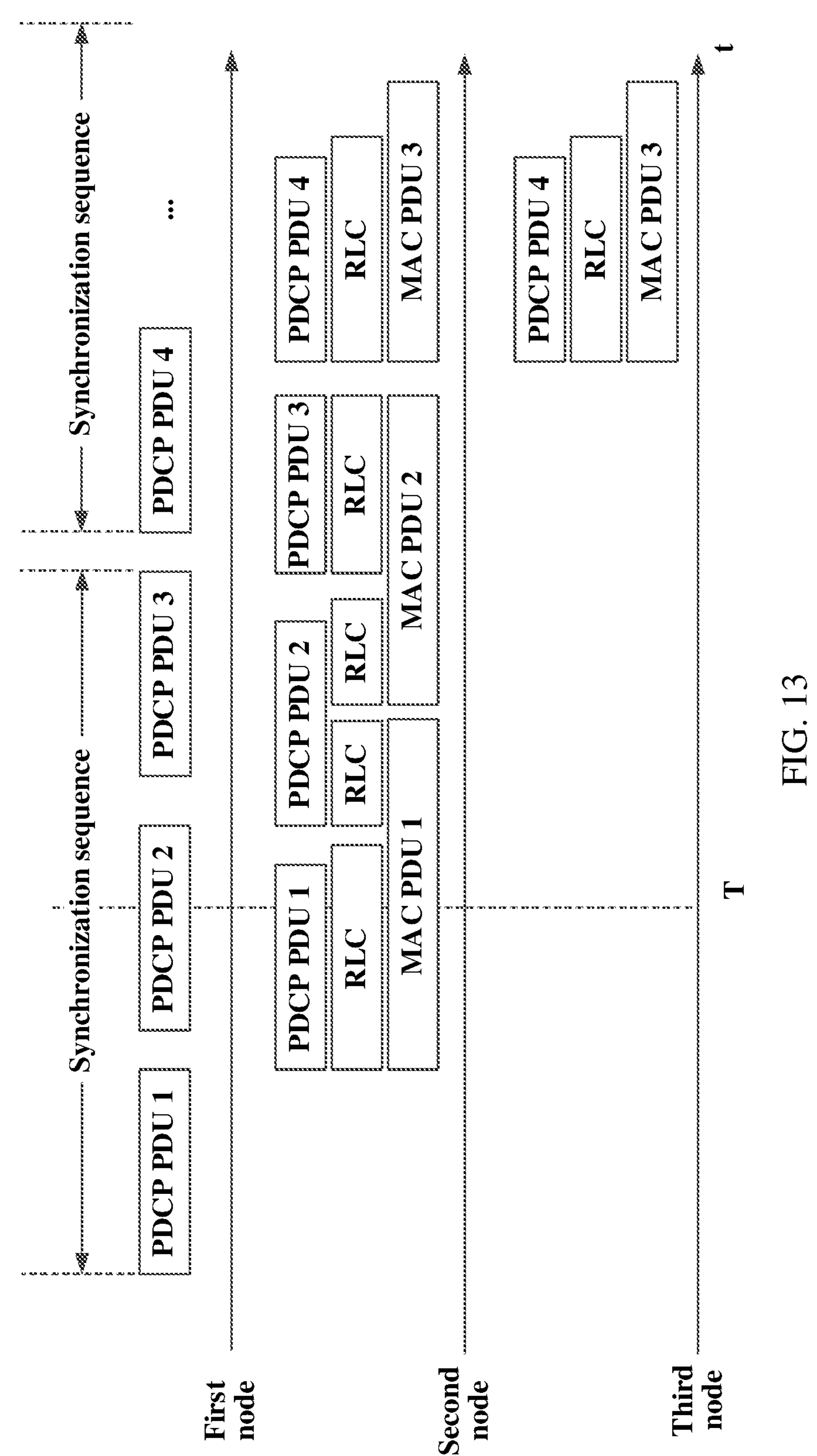
FIG. 13 is a schematic diagram of a time domain of another synchronous data sending process according to an embodiment of this application.

As shown in FIG. 13, the PDCP PDU 1, the PDCP PDU 2, and the PDCP PDU 3 are a plurality of PDCP PDUs belonging to a same synchronization sequence. The first node may receive the third sending status information from the second node. The third sending status information may indicate that the sending time point of the DCP PDU 4 is at the start location of the MAC PDU, or indicate that the PDCP PDU 4 and the PDCP PDU 3 are not concatenated in a same MAC PDU. For the second node, the PDCP PDU 1, the PDCP PDU 2, the PDCP PDU 3, and the PDCP PDU 4 may be assembled into the MAC PDU 1, the MAC PDU 2, and the MAC PDU 3. If the first node receives the first request from the third node at the moment T, where T is the second moment, t1<T<t2, and t1 and t2 are respectively sending time points of the PDCP PDU 1 and the PDCP PDU 4, the first node may learn, based on the third sending status information, that the PDCP PDU 4 is a 1$^{st}$ PDCP PDU whose sending time point is after the moment T and whose sending time point is at the start location of the MAC PDU, and the first node may learn that the PDCP PDU 4 is a 1$^{st}$ data packet in the synchronization sequence. Therefore, the first node may determine that the fifth PDCP PDU includes a synchronization sequence in which the PDCP PDU 4 is used as the 1$^{st}$ data packet. Then, the first node may send the fifth PDCP PDU to the third node, and use a packet header of the fifth PDCP PDU to carry indication information of the sending time point t4. The indication information is the fifth target sending time information.

In this manner, the first node may send a plurality of synchronization sequences to the second node, including a synchronization sequence including the PDCP PDU 1, the PDCP PDU 2, and the PDCP PDU 3 and a synchronization sequence including the PDCP PDU 4. Then, the second node performs operations such as splitting and/or concatenation, to obtain a plurality of MAC PDUs including the MAC PDU 1, the MAC PDU 2, and the MAC PDU 3, and sends the third sending status information to the first node, to indicate that the MAC PDU 3 corresponds to the PDCP PDU 4 and does not correspond to any PDCP PDU before the PDCP PDU 4. In addition, the first node may receive the second request from the third node before or after sending any one of the plurality of synchronization sequences, and before or after receiving the third sending status information, provided that the moment T at which the first request is received is between t1 and t2. After determining the fifth PDCP PDU based on the third sending status information, the first node may send the fifth PDCP PDU and the fifth target sending time information to the third node.

The foregoing examples separately provide an emergency synchronous transmission joining manner and a non-emergency synchronous transmission joining manner. Whether to use the emergency synchronous transmission joining manner or the non-emergency synchronous transmission joining manner may be determined by a service type, or may be indicated by the core network to the first node. For example, in the foregoing example, if a priority of the first service is higher than a priority threshold, for example, a weather disaster warning service or a V2X service, when the third node requests to join synchronous transmission of the first service, the emergency joining manner may be used. If a priority of the second service is not higher than a priority threshold, when the third node requests to join synchronous transmission of the second service, the non-emergency joining manner may be used. For another example, when a user being served by the third node includes a special terminal, the core network indicates, to the first node, that the third node whose ID is A is a high-priority node, or the third node uses the first request or the second request to carry indication information, and the first node may determine to use the emergency joining manner. For another example, if the data of the service is sent by using the synchronization sequence or sent target time information cannot be adjusted for a slave node that is providing a service, for example, in a base station scenario in which terminals in an industrial scenario are controlled together, when the third node requests to join synchronous transmission of the service, the non-emergency joining manner may be used.

Based on a same inventive concept as the method embodiment, an embodiment of this application further provides a communication apparatus. The communication apparatus may be configured to implement a function of at least one of the first node, the second node, or the third node in the method embodiment. For specific functions, refer to the method embodiment. Details are not described herein again. For a structure of the communication apparatus, refer to FIG. 4 and/or FIG. 5.

Based on a same inventive concept, an embodiment of this application further provides a communication system. The communication system may include the first node and the second node in the method embodiment, and optionally, may further include a third node. Optionally, the communication system may implement a function implemented by at least one of the first node, the second node, or the third node in the method embodiment.

Based on a same inventive concept, an embodiment of this application further provides a computer-readable storage medium. The computer-readable storage medium is configured to store a computer program. When the computer program is executed by a computer, the computer may implement a function implemented by at least one of the first node, the second node, or the third node in the method embodiment.

Based on a same inventive concept, an embodiment of this application further provides a computer program product. The computer program product is configured to store a computer program. When the computer program is executed by a computer, the computer may implement a function implemented by at least one of the first node, the second node, or the third node in the method embodiment.

Based on a same inventive concept, an embodiment of this application further provides a chip or a chip system (or a circuit). The chip may include a processor. The processor may be configured to invoke a program or instructions in a memory, to perform a function implemented by at least one of the first node, the second node, or the third node in the method embodiment.

It should be understood that, the processor mentioned in embodiments of this application may be a CPU or may be another general purpose processor, a digital signal processor (DSP), an application-specific integrated circuit (ASIC), a field programmable gate array (FPGA) or another programmable logical device, a discrete gate or transistor logic device, a discrete hardware component, or the like. The general-purpose processor may be a microprocessor, or the processor may be any conventional processor, or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example rather than limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed communication method and communication apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected based on an actual requirement, to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing computer-readable storage medium may be any usable medium that can be accessed by a computer. The computer-readable medium may include but is not limited to a RAM, a ROM, an EEPROM, a compact disc read-only memory (compact disc read-only memory, CD-ROM), a universal serial bus flash disk (universal serial bus flash disk), a removable hard disk, or another optical disc storage, a magnetic disk storage medium, or another magnetic storage device, or any other medium that can be used to carry or store expected program code in an instruction or data structure form and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A communication method, comprising:

sending, by a first node, first target sending time information to a second node, wherein the first target sending time information indicates a sending time point of a first packet data convergence protocol (PDCP) protocol data unit (PDU), and the sending time point of the first PDCP PDU indicates a time point at which the second node is to send the first PDCP PDU to user equipment (UE);

receiving, by the first node, first sending status information from the second node, wherein the first sending status information is associated with the first PDCP PDU, wherein the first sending status information comprises at least one of the following: information used to determine a correspondence between the first PDCP PDU and a MAC PDU; segmentation information of the first PDCP PDU; concatenation information of the first PDCP PDU; information indicating whether sending of the first PDCP PDU is completed; or resource utilization information; and sending, by the first node, second target sending time information to the second node based on the first sending status information, wherein the second target sending time information indicates a sending time point of a second PDCP PDU, and the sending time point of the second PDCP PDU indicates a time point at which the second node is to send the second PDCP PDU to the UE.

2. The method according to claim 1, wherein the first sending status information indicates one of a sending completion time point of the first PDCP PDU, to increase a sending interval between PDCP PDUs, or to reduce a sending interval between PDCP PDUs.

3. The method according to claim 1, further comprising:

sending, by the first node, at least one of the following information:

first indication information, wherein the first indication information indicates that the first PDCP PDU needs to be synchronously sent by a plurality of nodes; and second indication information, wherein the second indication information indicates that the second PDCP PDU needs to be synchronously sent by a plurality of nodes.

4. The method according to claim 1, further comprising:

sending, by the first node, at least one of the following information:

an identifier of the second node;

information used to request the first sending status information;

sending condition information of the first sending status information;

third indication information, wherein the third indication indicates whether the first PDCP PDU comprises a plurality of PDCP PDUs belonging to a same synchronization sequence; or fourth indication information, wherein the fourth indication indicates whether the second PDCP PDU comprises a plurality of PDCP PDUs belonging to a same synchronization sequence.

5. The method according to claim 1, wherein the first PDCP PDU comprises one PDCP PDU or comprises a plurality of PDCP PDUs belonging to a same synchronization sequence.

6. The method according to claim 5, wherein the first PDCP PDU comprises a plurality of PDCP PDUs belonging to a same synchronization sequence, the synchronization sequence is one in a synchronization sequence group continuously sent by the first node, and the first target sending time information specifically indicates a sending time point of a first synchronization sequence in the synchronization sequence group and a sending interval between synchronization sequences in the synchronization sequence group.

7. The method according to claim 5, wherein the first PDCP PDU comprises a plurality of PDCP PDUs belonging to a same synchronization sequence, and the method further comprises:

sending, by the first node, at least one of the following information:

a sequence number of each PDCP PDU in the synchronization sequence; and a sum of sizes of all PDCP PDUs in the synchronization sequence before each PDCP PDU.

8. The method according to claim 1, further comprising:

receiving, by the first node, a first request from a third node, wherein the first request is used to request data of a first service, and the data of the first service is synchronously sent by the second node and the third node to the UE; and sending, by the first node, third target sending time information, a third PDCP PDU, and a fourth PDCP PDU to the third node, wherein the fourth PDCP PDU is located before the third PDCP PDU, an end part bit of the fourth PDCP PDU and the third PDCP PDU correspond to a same MAC PDU, the third target sending time information indicates a sending time point of the third PDCP PDU, the third PDCP PDU is a $1^{st}$ data packet whose sending time point is after a first moment, and the first moment is a moment at which the first node receives the first request.

9. The method according to claim 8, further comprising:

receiving, by the first node, second sending status information from the second node, to determine information indicating that the third PDCP PDU and the fourth PDCP PDU correspond to a same MAC PDU; and determining, by the first node based on the second sending status information, that the third PDCP PDU is the first data packet whose sending time point is after the first moment.

10. The method according to claim 8, further comprising:

sending, by the first node, fourth target sending time information to the second node, wherein the fourth target sending time information indicates a sending time point of the third PDCP PDU; and sending, by the first node, the third target sending time information to the second node, wherein the third target sending time information further indicates the sending time point of the third PDCP PDU, and the sending time point that is of the third PDCP PDU and that is indicated by the fourth target sending time information is different from the sending time point indicated by the third target sending time information.

11. The method according to claim 1, further comprising:

receiving, by the first node, a second request from the third node, wherein the second request is used to request data of a second service, and the data of the second service is synchronously sent by the second node and the third node to the UE; and sending, by the first node, fifth target sending time information and a fifth PDCP PDU to the third node, wherein the fifth target sending time information indicates a sending time point of the fifth PDCP PDU, the fifth PDCP PDU is a first PDCP PDU whose sending time point is after a second moment and whose sending time point is at a start location of a MAC PDU, and the second moment is a moment at which the first node receives the second request.

12. The method according to claim 11, further comprising:

receiving, by the first node, third sending status information from the second node, wherein the third sending status information is used to determine that the sending time point of the fifth PDCP PDU is at a start location of a MAC PDU of the second node; and determining, by the first node based on the third sending status information, that the fifth PDCP PDU is a first PDCP PDU whose sending time point is after the second moment and whose sending time point is at the start location of the MAC PDU of the second node.

13. A communication method, comprising:

receiving, by a second node, first target sending time information from a first node, wherein the first target sending time information indicates a sending time point of a first packet data convergence protocol (PDCP) protocol data unit (PDU), and the sending time point of the first PDCP PDU indicates a time point at which the second node is to send the first PDCP PDU to user equipment (UE);

sending, by the second node, first sending status information to the first node, wherein the first sending status information is associated with the first PDCP PDU, wherein the first sending status information comprises at least one of the following: information used to determine a correspondence between the first PDCP PDU and a MAC PDU; segmentation information of the first PDCP PDU; concatenation information of the first PDCP PDU; information indicating whether sending of the first PDCP PDU is completed; or resource utilization information; and receiving, by the second node, second target sending time information from the first node, wherein the second target sending time information indicates a sending time point of the second PDCP PDU, the sending time point of the second PDCP PDU indicates a time point at which the second node is to send the second PDCP PDU to the UE, and the second target sending time information is determined based on the first sending status information.

14. The method according to claim 13, wherein the first sending status information indicates one of a sending completion time point of the first PDCP PDU, or to increase a sending interval between PDCP PDUs, or to reduce a sending interval between PDCP PDUs.

15. The method according to claim 13, further comprising:

receiving, by the second node, at least one of the following information:

first indication information, wherein the first indication information indicates that the first PDCP PDU needs to be synchronously sent by a plurality of nodes; and second indication information, wherein the second indication information indicates that the second PDCP PDU needs to be synchronously sent by a plurality of nodes.

16. The method according to claim 13, further comprising:

receiving, by the second node, at least one of the following information:

an identifier of the second node;

information used to request the first sending status information;

sending condition information of the first sending status information;

third indication information, wherein the third indication indicates whether the first PDCP PDU comprises a plurality of PDCP PDUs belonging to a same synchronization sequence; or fourth indication information, wherein the fourth indication indicates whether the second PDCP PDU comprises a plurality of PDCP PDUs belonging to a same synchronization sequence.

17. The method according to claim 13, wherein the first PDCP PDU comprises one PDCP PDU or comprises a plurality of PDCP PDUs belonging to a same synchronization sequence.

18. A communication method, comprising:

sending, by a third node, a first request to a first node, wherein the first request is used to request data of a first service, and the data of the first service is synchronously sent by a second node and the third node to user equipment (UE; and receiving, by the third node, third target sending time information, a third packet data convergence protocol (PDCP) protocol data unit (PDU), and a fourth PDCP PDU from the first node, wherein the fourth PDCP PDU is located before the third PDCP PDU, an end part bit of the fourth PDCP PDU and the third PDCP PDU correspond to a same MAC PDU, the third target sending time information indicates a sending time point of the third PDCP PDU, the third PDCP PDU is a first data packet whose sending time point is after a first moment, and the first moment is a moment at which the first node receives the first request.

* * * * *